(12) United States Patent
Masuoka et al.

(10) Patent No.: US 9,652,824 B2
(45) Date of Patent: May 16, 2017

(54) DISPLAY SYSTEM, DISPLAY DEVICE, DISPLAY TERMINAL, DISPLAY METHOD OF DISPLAY TERMINAL, AND CONTROL PROGRAM

(75) Inventors: Nobuo Masuoka, Ibaraki (JP); Hiroshi Shimizu, Tokyo (JP); Kazuhiko Yoshizawa, Ibaraki (JP); Hideo Nishijima, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 212 days.

(21) Appl. No.: 14/406,897

(22) PCT Filed: Jun. 29, 2012

(86) PCT No.: PCT/JP2012/066639
§ 371 (c)(1),
(2), (4) Date: Dec. 10, 2014

(87) PCT Pub. No.: WO2014/002241
PCT Pub. Date: Jan. 3, 2014

(65) Prior Publication Data
US 2015/0130847 A1    May 14, 2015

(51) Int. Cl.
*G06T 3/40* (2006.01)
*G06T 3/00* (2006.01)
(Continued)

(52) U.S. Cl.
CPC ............... *G06T 3/40* (2013.01); *G06F 3/038* (2013.01); *G06K 9/3216* (2013.01);
(Continued)

(58) Field of Classification Search
None
See application file for complete search history.

(56) References Cited

U.S. PATENT DOCUMENTS

| 2007/0216644 A1* | 9/2007 | Nam ..................... G06F 3/0386 345/158 |
| 2011/0149101 A1* | 6/2011 | Kim ................... G06K 9/00449 348/222.1 |
| 2012/0249421 A1* | 10/2012 | Shinozaki ............. G06F 3/0425 345/157 |

FOREIGN PATENT DOCUMENTS

| JP | 58-223016 A | 12/1983 |
| JP | 2002-196739 A | 7/2002 |

(Continued)

*Primary Examiner* — James A Thompson
(74) *Attorney, Agent, or Firm* — Mattingly & Malur, PC

(57) ABSTRACT

Since a display device is used in a relatively large room, it often displays images on a large screen. On the other hand, a display terminal often displays images on a small screen. Therefore, when the same image is displayed on the display device and the display terminal, the displayed image on the display terminal is so small that the viewer has difficulty in discerning details of the image, which poses a problem that the display terminal is disadvantageous. In a display system including a display terminal and a display device, the display device detects position coordinates optically pointed out by a pointer on a displayed image, and displays a given pointer mark at the detected position coordinates. The display terminal displays a magnified version of the displayed image approximately around received position coordinates serving as a center thereof, and displays a given pointer mark at the position coordinates.

12 Claims, 19 Drawing Sheets

Figure 1:
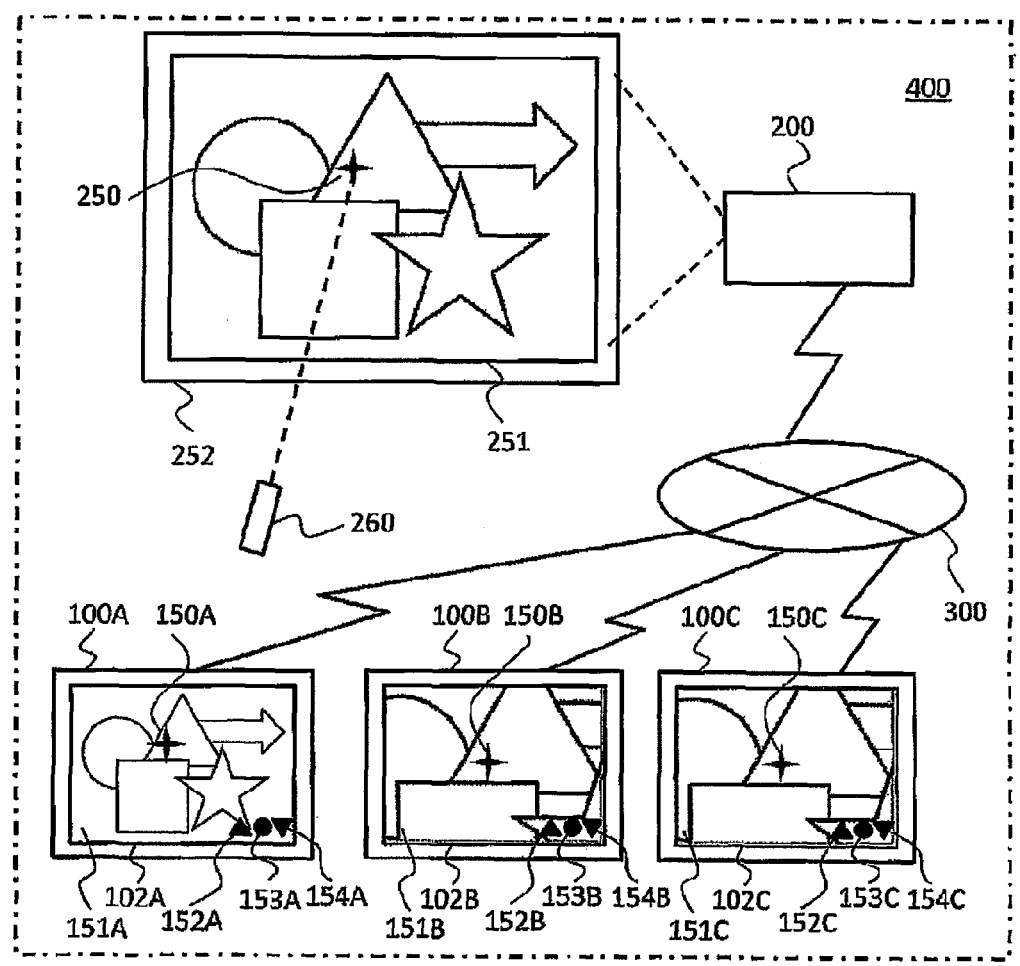

(51) Int. Cl.
  *G09G 3/20*    (2006.01)
  *G06F 3/038*   (2013.01)
  *G06K 9/32*    (2006.01)

(52) U.S. Cl.
  CPC ............ *G06T 3/0012* (2013.01); *G09G 3/20* (2013.01); *G09G 2340/045* (2013.01); *G09G 2340/145* (2013.01); *G09G 2354/00* (2013.01); *G09G 2360/04* (2013.01)

(56) References Cited

FOREIGN PATENT DOCUMENTS

| | | | | | |
|---|---|---|---|---|---|
| JP | 2004-032582 | A |   | 1/2004 | |
| JP | 2004-118807 | A |   | 4/2004 | |
| JP | 2005-234368 | A |   | 9/2005 | |
| JP | 2007-193403 | A | * | 8/2007 | ............ G06F 3/033 |
| JP | 2009-163142 | A |   | 7/2009 | |
| JP | 2009-192670 | A |   | 8/2009 | |
| JP | 2011-133541 |   | * | 7/2011 | ............... G09G 5/08 |
| JP | 2011-133541 | A |   | 7/2011 | |

\* cited by examiner

FIG. 4
(a)
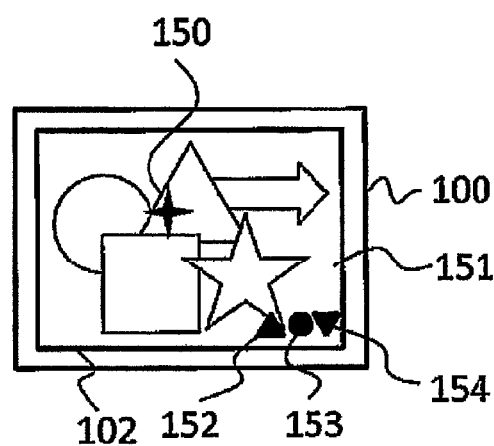
(b)
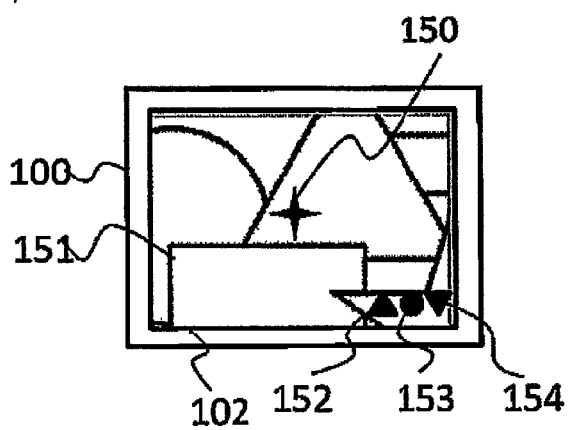
(c)
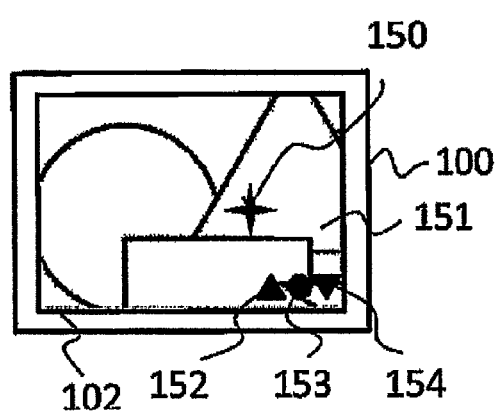

FIG. 12
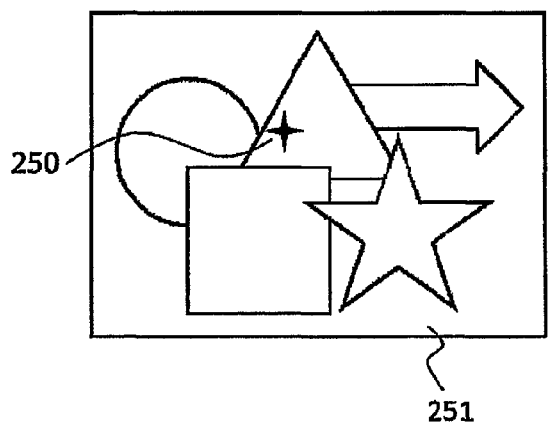
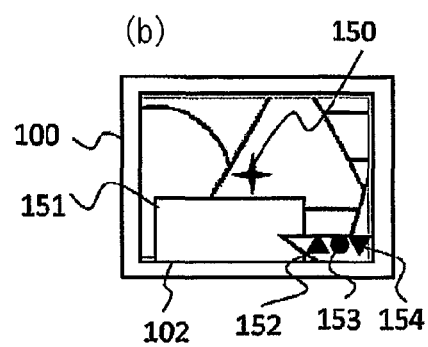
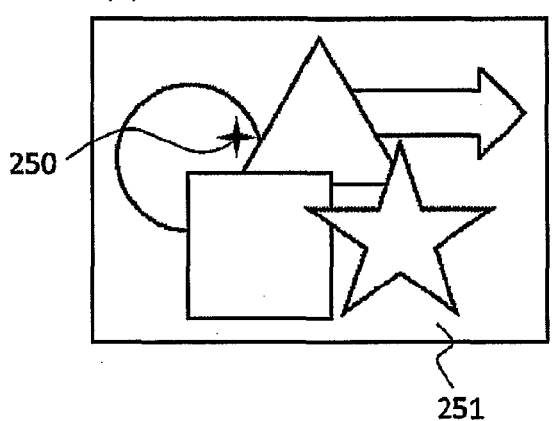
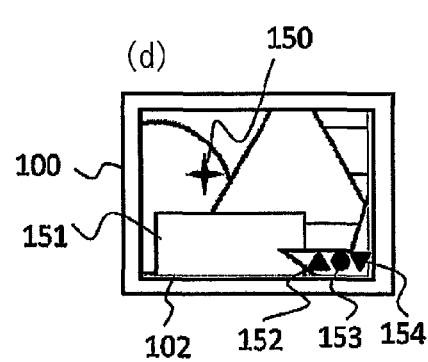
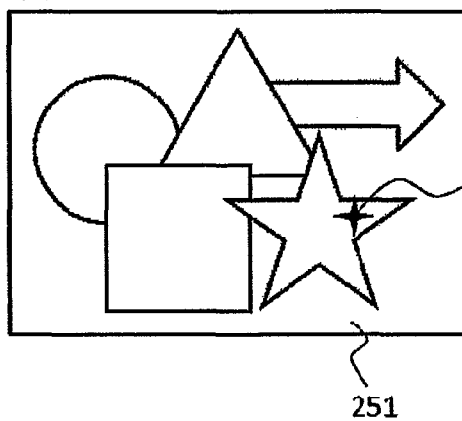
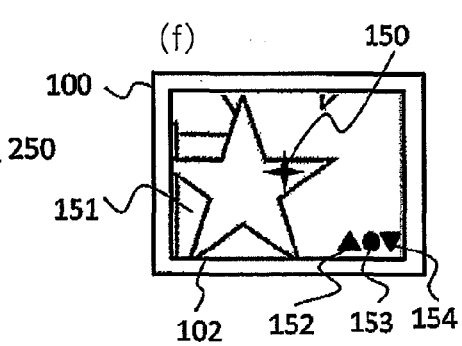

FIG. 18
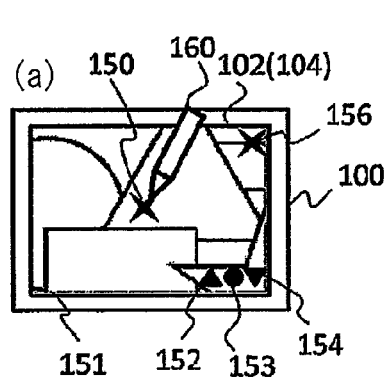
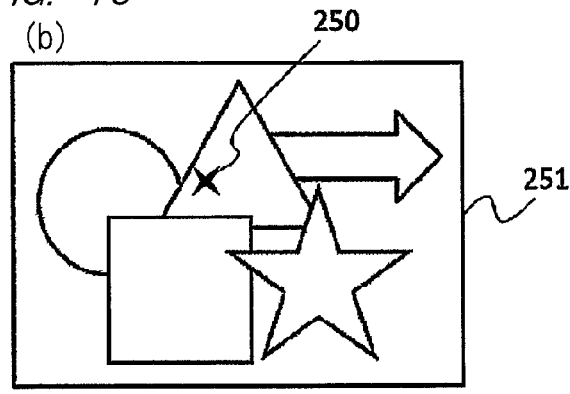
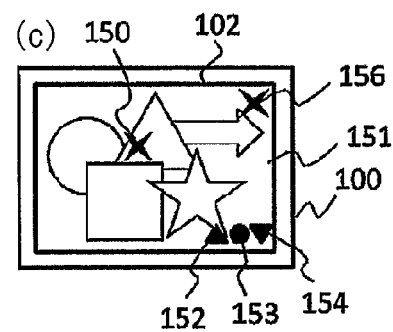
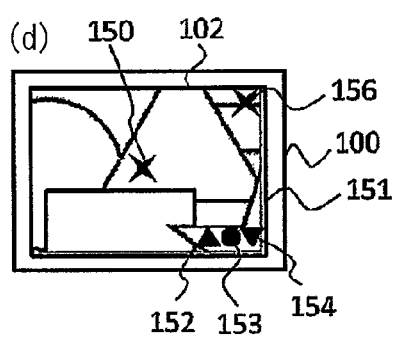
FIG. 19
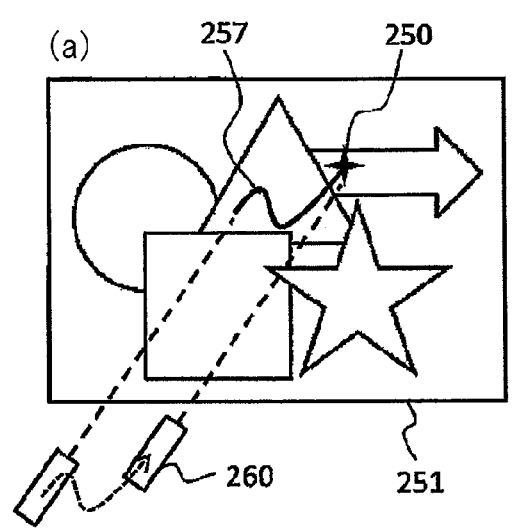
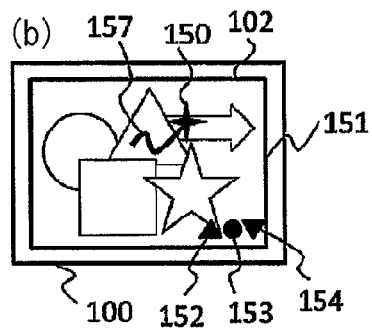
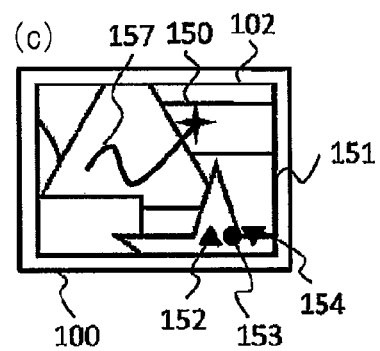

DISPLAY SYSTEM, DISPLAY DEVICE, DISPLAY TERMINAL, DISPLAY METHOD OF DISPLAY TERMINAL, AND CONTROL PROGRAM

TECHNICAL FIELD

The present invention relates to a display system in which a plurality of display terminals and display devices perform video display in cooperation with one another.

BACKGROUND ART

In recent years, a system or apparatus in which a plurality of display devices and display terminals perform video display in cooperation with one another has been widespread in the fields of video education and presentation. Patent Document 1 is one of techniques for such a video system. Patent Document 1 discloses that a movable pointer graphic is displayed on a lecture material on a terminal of a lecturer, and the same action as that made by the pointer graphic on the lecture material on the terminal of the lecturer is reproduced in real time on a lecture material displayed on a terminal of a participant.

RELATED ART DOCUMENTS

Patent Documents

Patent Document 1: Japanese Patent Application Laid-Open Publication No. 2004-32582

SUMMARY OF THE INVENTION

Problems to be Solved by the Invention

A presentation system for making a product presentation or the like by the use of one display device with a large screen such as a projector and display terminals distributed to individual viewers has been known. Such a presentation system poses a problem that, when the same image is displayed on the display device and the display terminals, the displayed image on the display terminals is so small that the viewer has difficulty in discerning detailed parts of the image.

Also, even if the display terminal has a magnifying function, just a part of an original image is displayed when the image is magnified. Therefore, when the image is magnified, the part of the image which the user intends to see is not always displayed, and it takes a lot of trouble to find the intended part of the magnified image on display, which leads to a problem of a lack of handiness.

Means for Solving the Problems

In order to solve the problems mentioned above, a display system of the present invention includes a display terminal that displays first image data and a display device that displays second image data in conjunction with the display terminal, display contents of the first image data include contents of a partial area of display contents of the second image data, and a pointer mark of the display terminal is displayed at an image position of the first image data that corresponds to an image position of the second image data at which a pointer mark of the display device is displayed.

Furthermore, according to the display system of the present invention, when the image position of the pointer mark displayed on the display device is shifted, the first image data displayed on the display terminal is changed.

Effects of the Invention

An object of the present invention is to provide a handy display system.

BRIEF DESCRIPTIONS OF THE DRAWINGS

Figure 2:
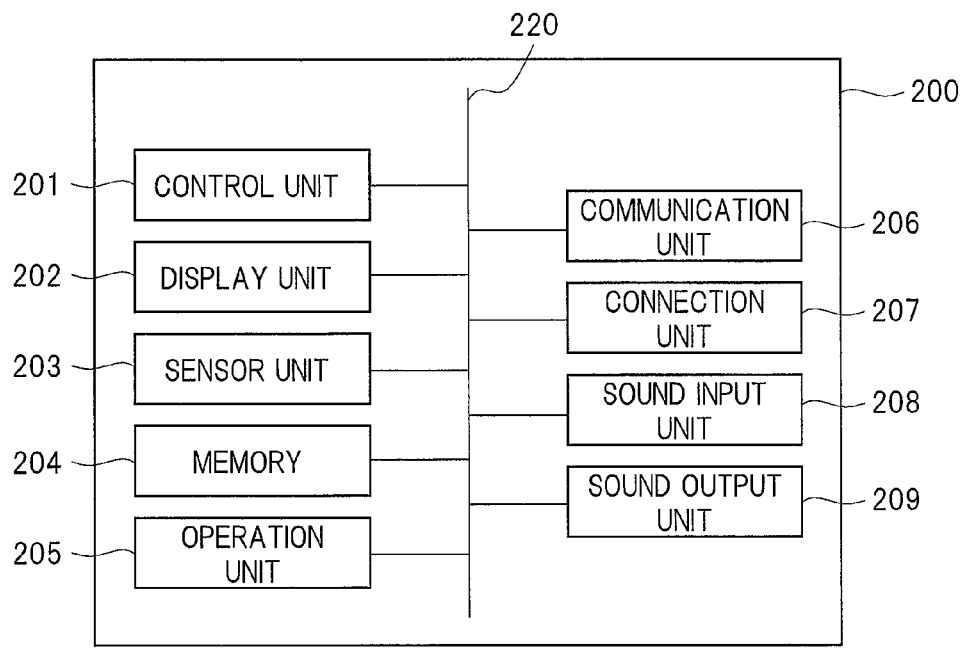
Figure 3:
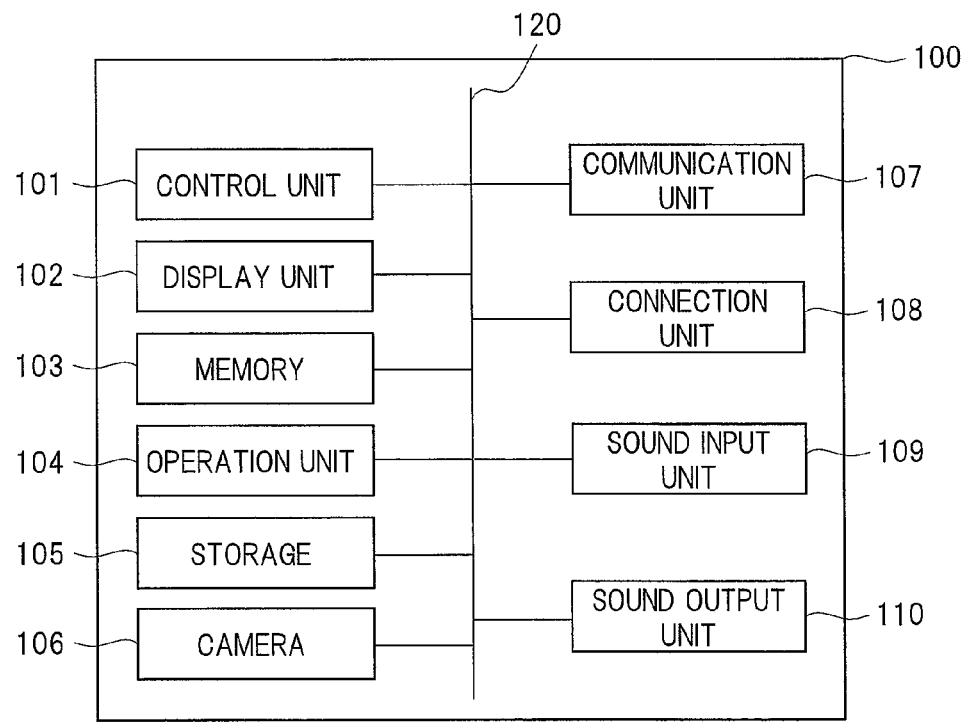
Figure 5:
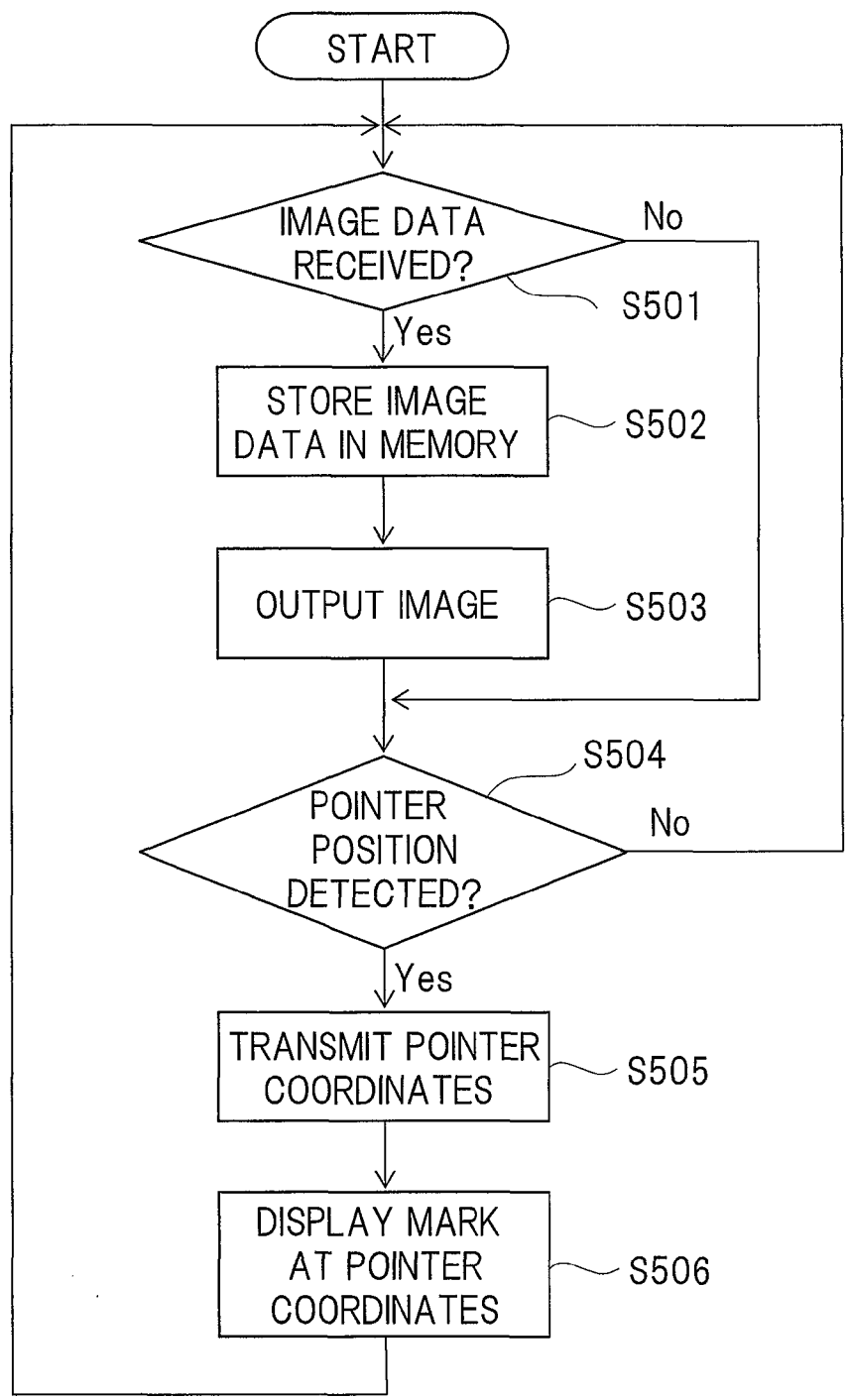
Figure 6:
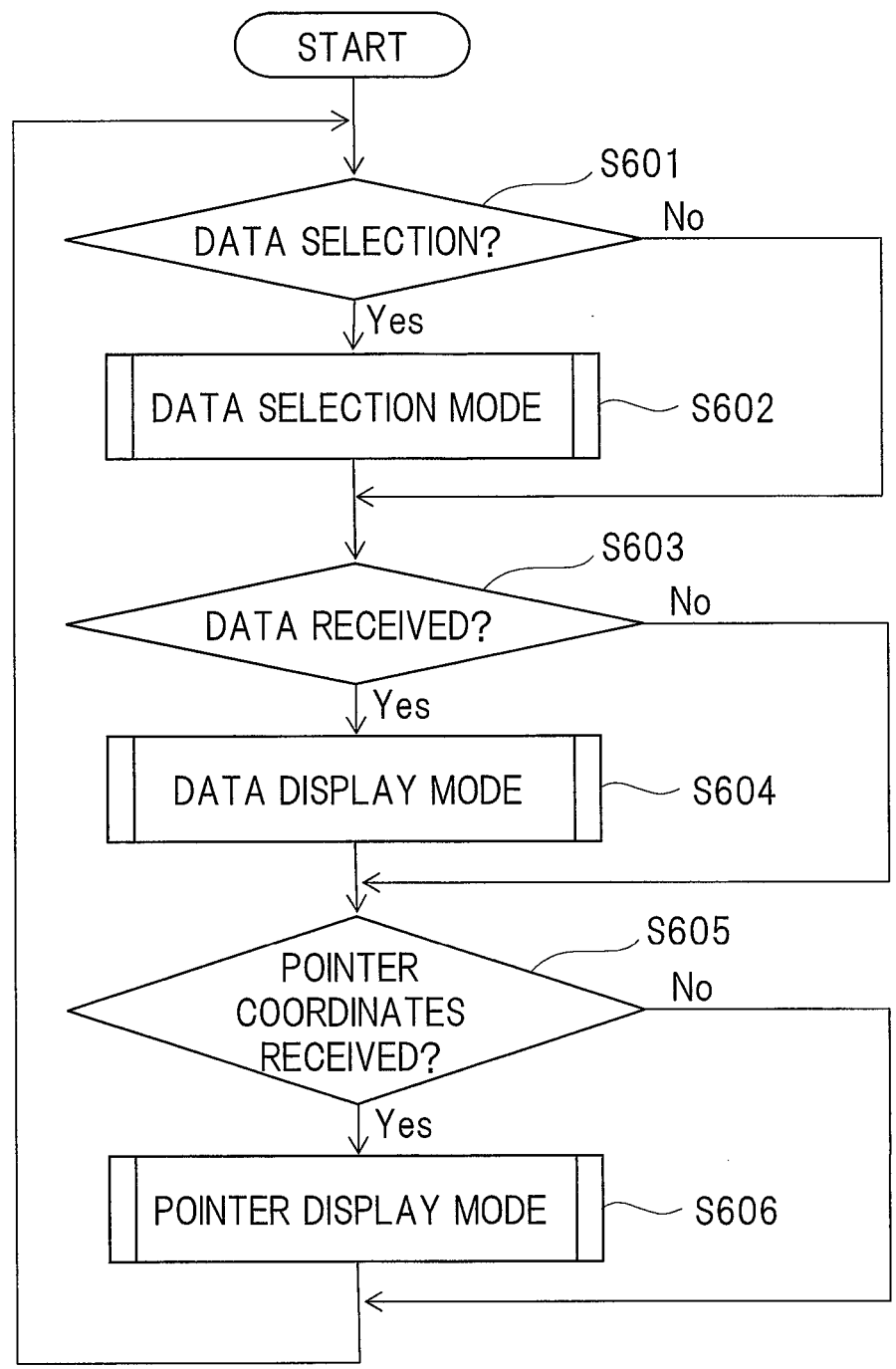
Figure 7:
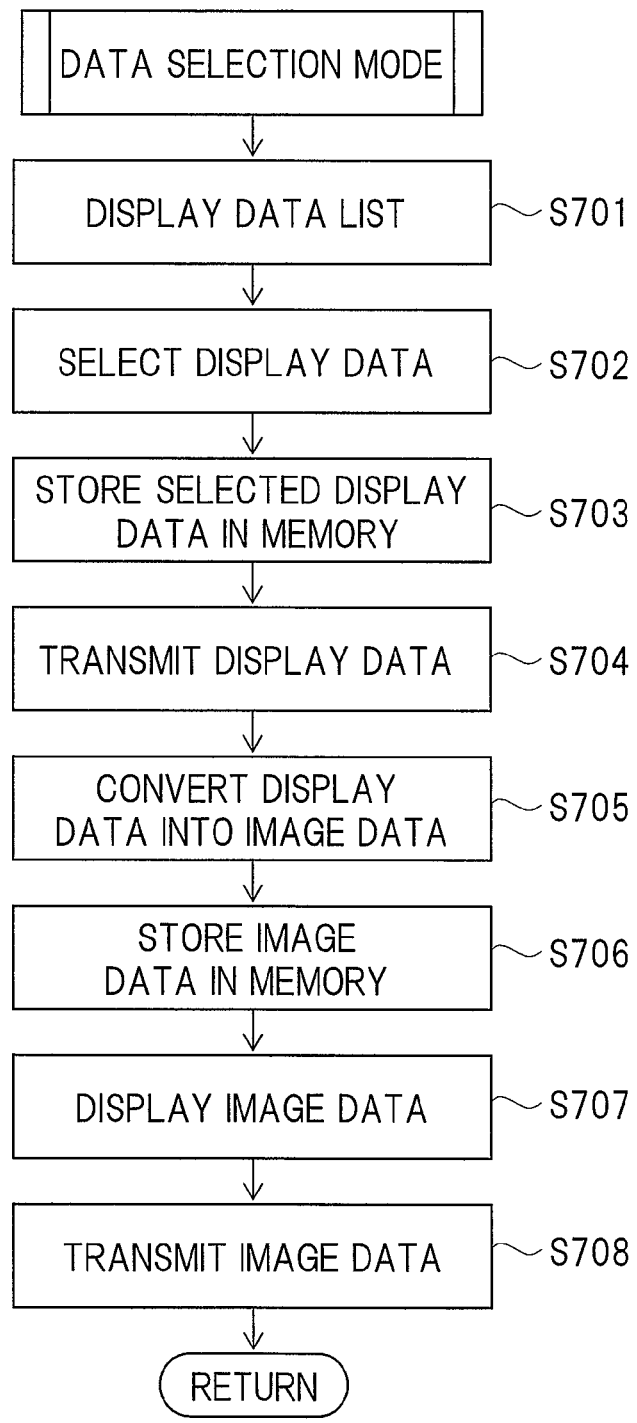
Figure 8:
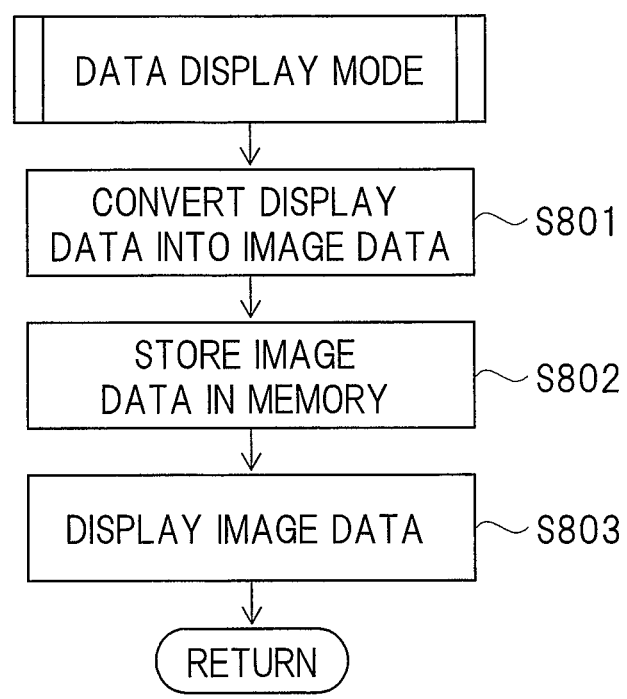
Figure 9:
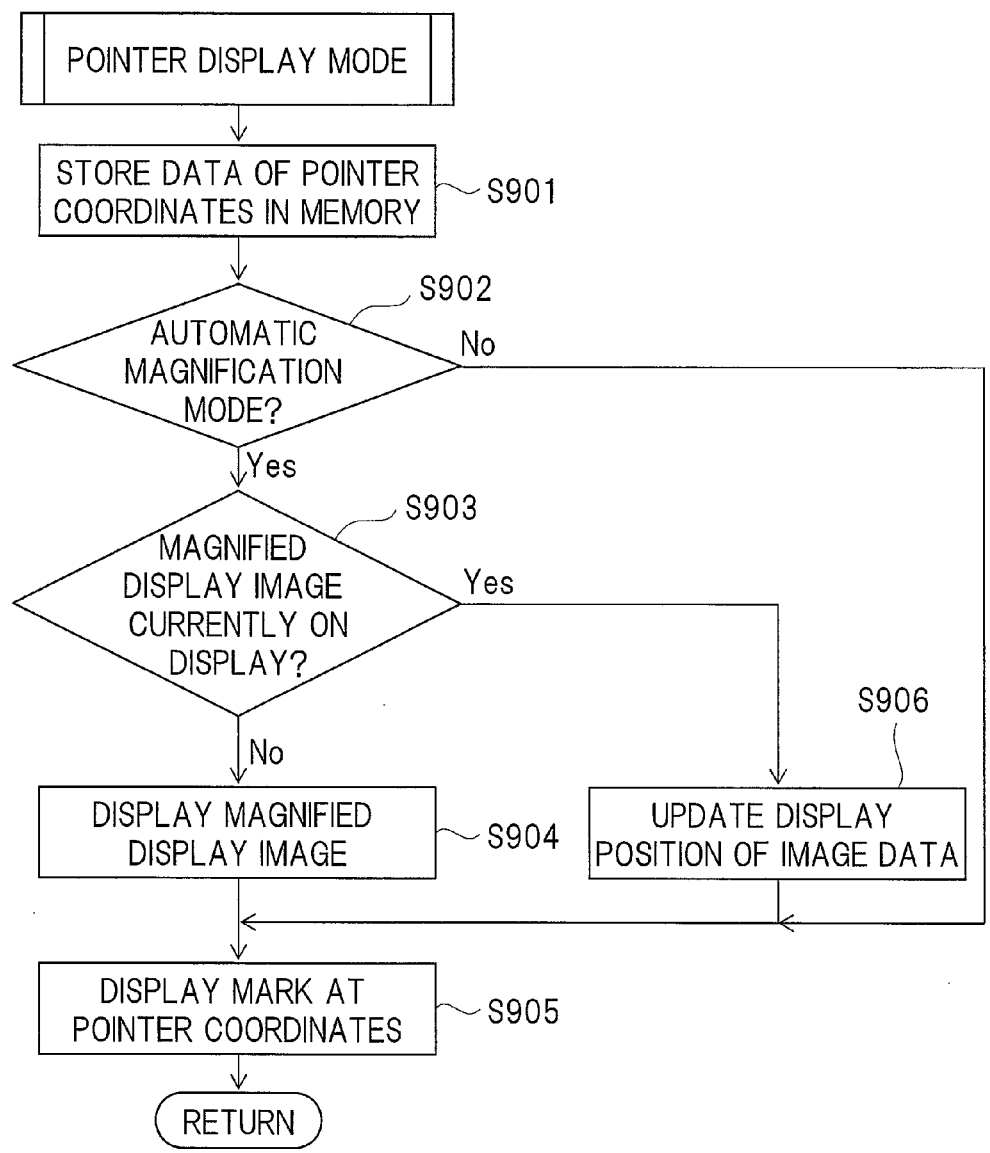
Figure 13:
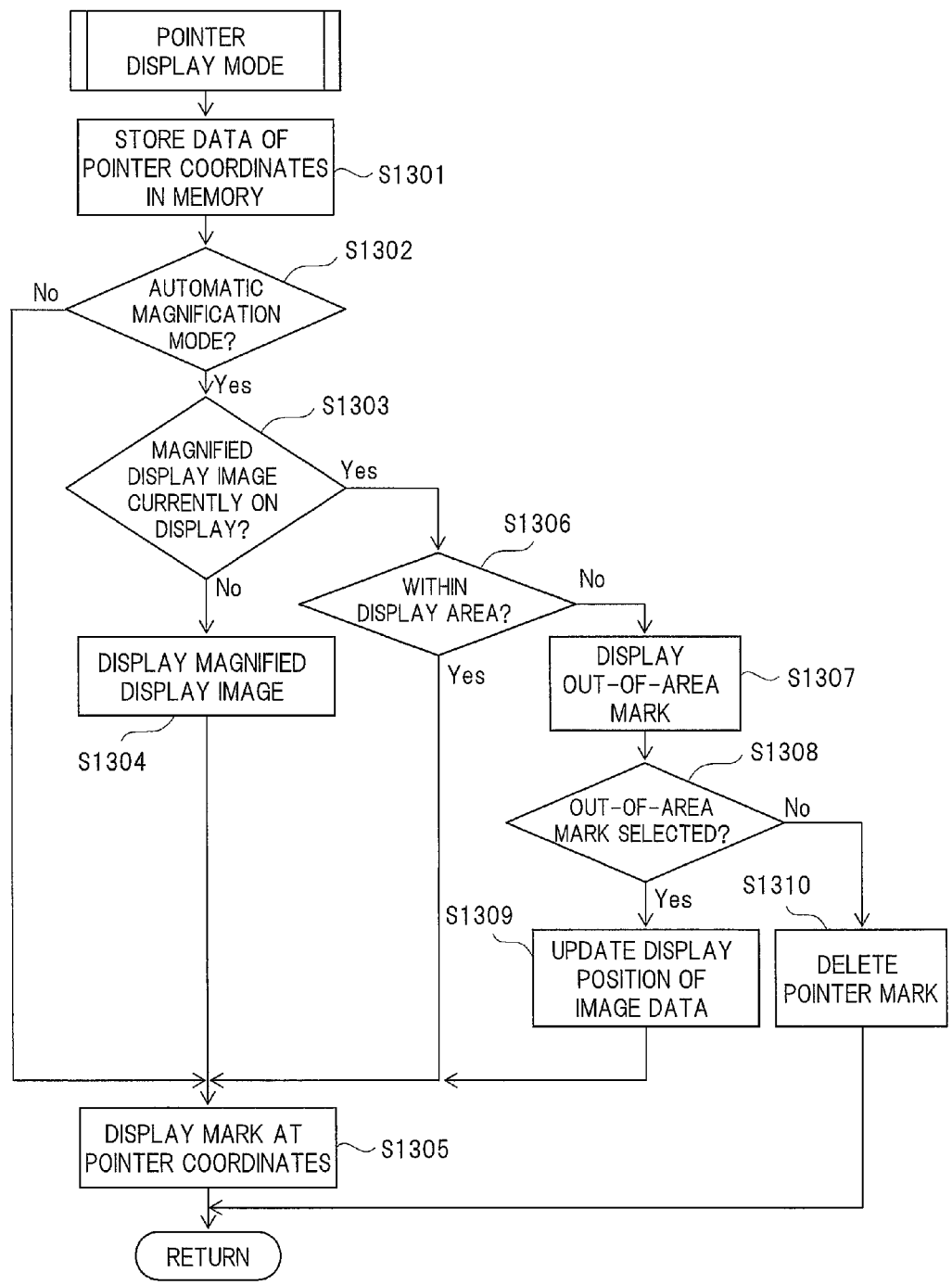
Figure 15:
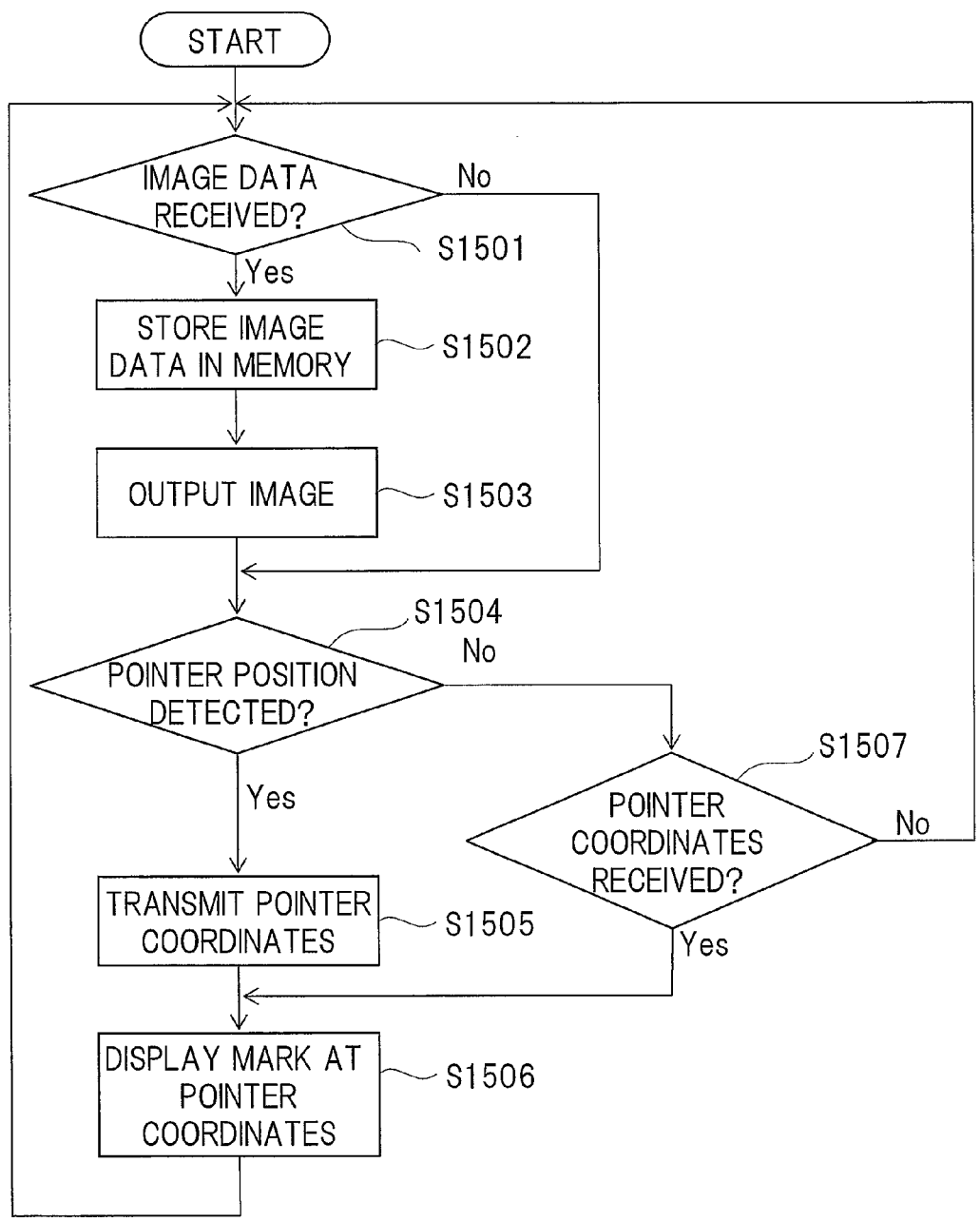
Figure 16:
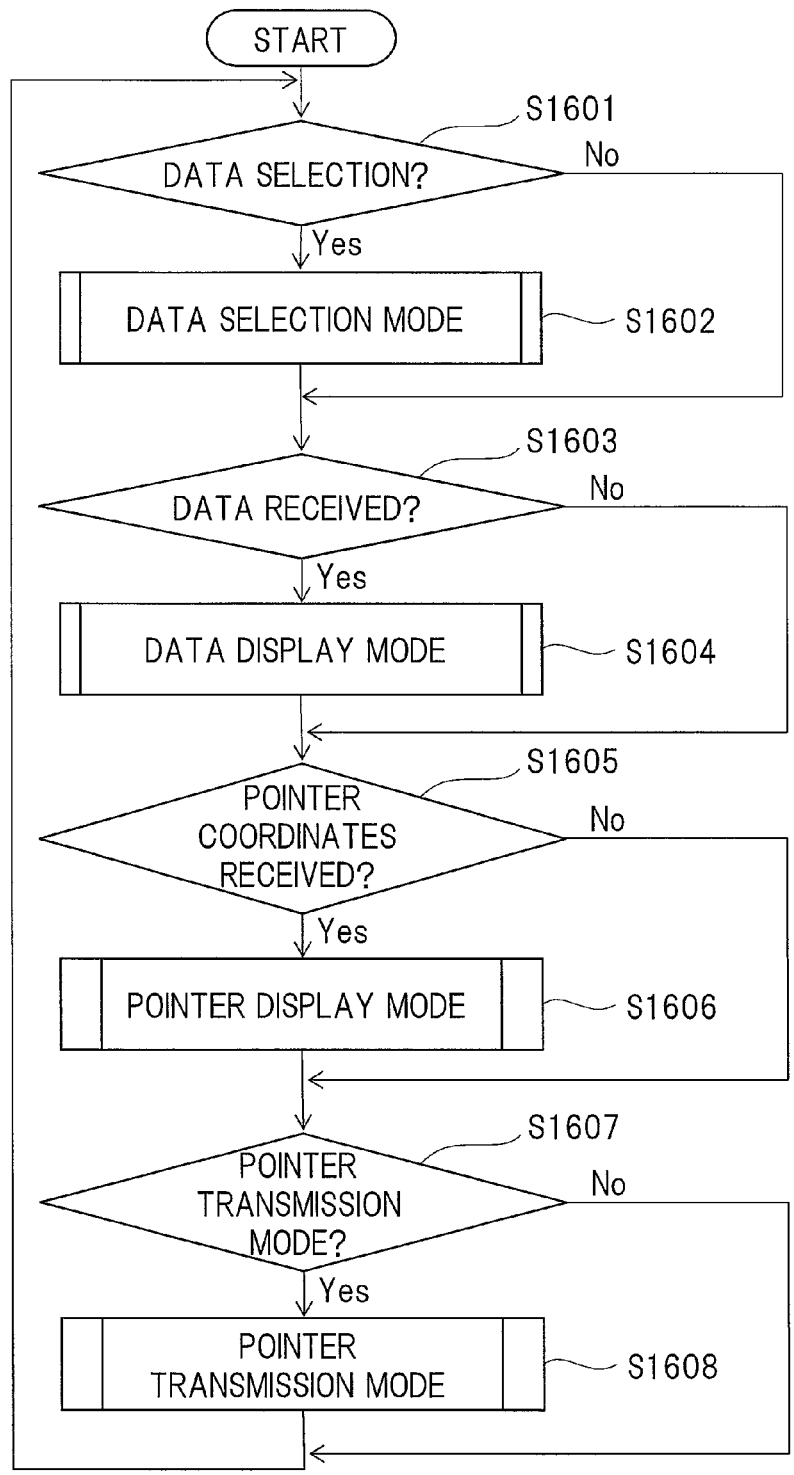
Figure 17:
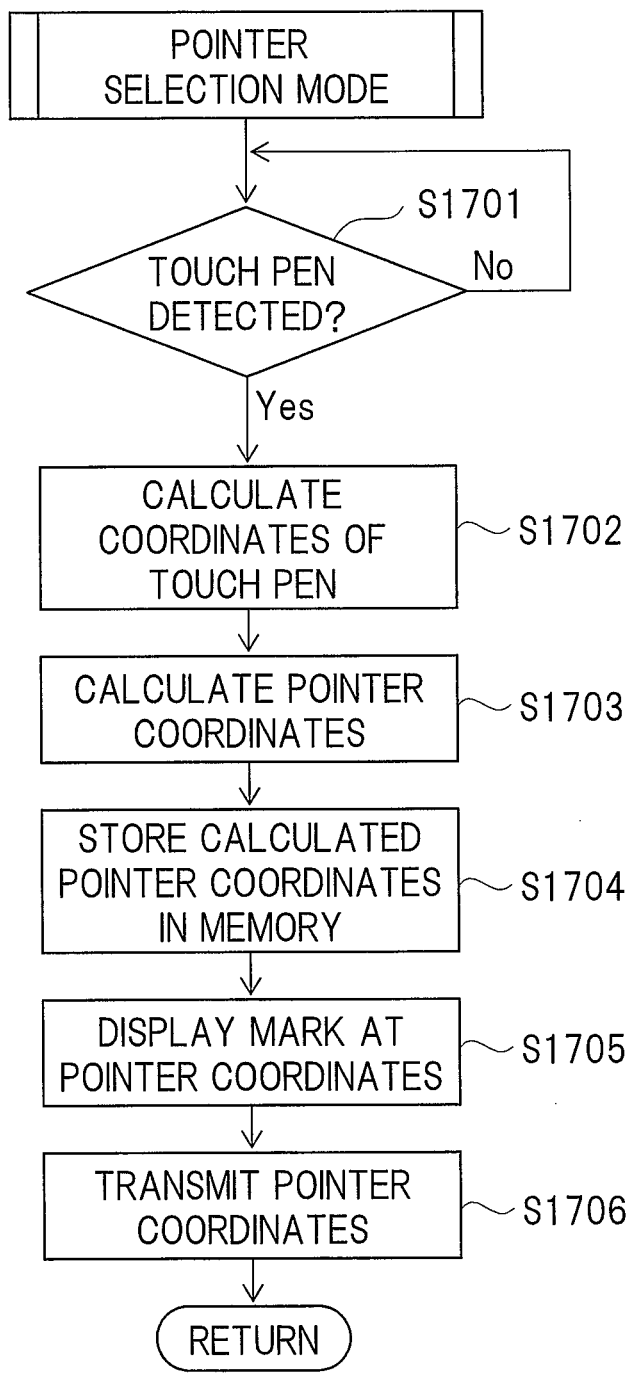

FIG. 1 is a configuration diagram of an example of an overall display system;
FIG. 2 is a configuration diagram of a display device;
FIG. 3 is a configuration diagram of a display terminal;
FIGS. 4(a)-4(c) depict examples in which a display image and a pointer mark are displayed in the display terminal;
FIG. 5 is a flowchart showing an operation of the display device;
FIG. 6 is a flowchart of a main operation of the display terminal;
FIG. 7 is a flowchart showing an operation in a data selection mode;
FIG. 8 is a flowchart showing an operation in a data display mode;
FIG. 9 is a flowchart showing an operation in a pointer display mode;
FIGS. 10(a)-10(f) depict examples of images displayed on the display terminal and the display device;
FIG. 11 is a flowchart of an operation in the pointer display mode according to a second embodiment;
FIGS. 12(a)-12(f) depict examples of images displayed on the display terminal and the display device according to the second embodiment;
FIG. 13 is a flowchart of an operation in the pointer display mode according to a third embodiment;
FIGS. 14(a)-14(g) depict examples of images displayed on the display terminal and the display device according to the third embodiment;
FIG. 15 is a flowchart showing an operation of the display device according to a fourth embodiment;
FIG. 16 is a flowchart of a main operation of the display terminal according to the fourth embodiment;
FIG. 17 is a flowchart showing an operation in a pointer transmission mode according to the fourth embodiment;
FIGS. 18(a)-18(d) depict examples of images displayed on the display terminal and the display device according to the fourth embodiment;
FIGS. 19(a)-19(c) depict examples of images displayed on the display terminal and the display device according to a fifth embodiment;
FIGS. 20(a)-20(e) depict examples of images displayed on the display terminal and the display device according to a sixth embodiment; and
FIGS. 21(a)-21(d) depict examples of images displayed on the display terminal and the display device according to a seventh embodiment.

EMBODIMENTS

Embodiments of the present invention will be described below with reference to drawings.

First Embodiment

Hereinafter, specific embodiments of a display system according to the present invention will be described with reference to the drawings.

FIG. 1 is a configuration diagram of an example of the overall display system of the present invention. A display system 400 includes display terminals 100A, 100B, and 100C connected to a network 300, and a display device 200. Although FIG. 1 depicts three display terminals 100 and one display device 200 included in the display system 400, the numbers of the display terminals and display devices are not limited thereto, and any numbers may be adopted as long as the numbers are one or more.

The display system 400 is used for, for example, meetings, lectures, presentations, and the like. The display device 200 is, for example, a projection display device such as projector, and it projects a display image 251 on a large screen 252. Participants are thus able to view the projected image 251 concurrently. Also, each display terminal 100 has a display unit 102 and a display image 151 is displayed on the display unit 102. Hence, users of the display terminals 100 are able to separately view the display image 151.

The display terminals 100 and the display device 200 are connected to the network 300 through radio communication, respectively. The network 300 is, for example, LAN (local Area Network), and communication with the network 300 is established through a wireless LAN of, for example, IEEE802.11a/b/n.

The display terminal 100A is used as a host terminal in the display system 400, and the other display terminals 100B and 100C are used as client terminals. The display terminal 100A serving as the host terminal converts selected display data into image data, displays the image data as a display image 151A on its own display unit 102A, and transmits the image data to the display device 200 through the network 300.

The display device 200 displays the image data received from the display terminal 100A through the network 300, as the display image 251. A pointer 260 is, for example, a laser pointer that emits laser light onto the screen to optically point out an arbitrary position on the display image 251. A presenter uses the pointer 260 when explaining the contents of the display image 251. The display device 200 is provided with a sensor unit (not depicted) having a function of detecting a position (coordinates)) pointed out by the pointer 260. Coordinates thus detected will hereinafter be referred to as pointer coordinates. The display device 200 displays a pointer mark 250 at the position corresponding to the pointer coordinates in a superposed manner on the display image 251, thereby emphatically indicating the position pointed out by the pointer 260. Furthermore, the display device 200 transmits the pointer coordinates to the display terminals 100A, 100B, and 100C through the network 300.

In place of the pointer mentioned above, the display device 200 may have a pointer mark generating function so as to display a pointer mark on the display image 251 and transmit the pointer coordinates to the display terminals 100A, 100B, and 100C.

Also, the display terminal 100A transmits display data to the display terminals 100B and 100C serving as client terminals. The display terminals 100B and 100C convert the received display data into image data and display the image data as display images 151B and 151C on their own display units 102B and 102C. In this manner, the users are able to check the contents of the display image 251 projected on the screen 252 by the display device 200, by viewing the display units 102B and 102C of the display terminals which the users have at hand.

When the display terminal 100 receives data of pointer coordinates from the display device 200, the display terminal 100 displays a pointer mark 150 at the position corresponding to the pointer coordinates in a superposed manner on the display image 151. As a result, the user is able to check a position pointed out on the display image 251 by the pointer 260, by viewing the display unit 102 on hand.

Also, the display terminal 100 has a demagnifying button 152, an overall display button 153, and a magnifying button 154. When the magnifying button 154 is selected, the display image 151 is changed to a magnified version of image data. If the magnifying button 154 is selected when the magnified image data is on display, the display image 151 is further magnified. In this manner, the magnification scale of the display image 151 may be increased every time the magnifying button 154 is selected. The overall view of the image data can be displayed any time by selecting the overall display button 153 when the magnified image data is on display. Also, when the demagnifying button 152 is selected, the display image 151 is changed to a demagnified version of the image data. If the demagnifying button 152 is selected when the demagnified image data is on display, the display image 151 is further demagnified. In this manner, the magnification scale of the display image 151 may be reduced every time the demagnifying button 152 is selected.

The display image 251 is displayed on a large screen of, for example, 200 inches, while the display unit 102 of the display terminal 100 is a small screen of, for example, 10 inches. Therefore, when the whole image data is displayed on the display unit 102, the resulting image may be so small that its detailed contents are difficult to see. In such a case, by selecting the magnifying button 154 to display a magnified version of the image, the detailed contents of the image can be checked. However, just a part of the image data is displayed on the display unit 102 when the image is magnified. Therefore, when the image is magnified, the part of the image which the user intends to see is not always displayed. To solve this problem, the display system of the present invention displays a magnified image so that the pointer mark 150 is located at the approximate center of the image. Hereinafter, the configuration and operation of each device will be described in detail.

FIG. 2 is a configuration diagram of the display device 200. The display device 200 includes a control unit 201, a display unit 202, a sensor unit 203, a memory 204, an operation unit 205, a communication unit 206, a connection unit 207, a sound input unit 208, and a sound output unit 209, which are interconnected via a system bus 220.

The control unit 201 is, for example, a microprocessor that performs overall control for the display device 200. The system bus 220 is a data communication path for data transmission/reception between the control unit 201 and other component units in the display device 200. The display unit 202 is, for example, a liquid crystal projector that projects and displays an image on the screen 252. The sensor unit 203 is, for example, a camera that takes the display image 251 and applies image processing to the taken image by the control unit 203, thereby detecting the pointer coordinates representing a position (coordinates) pointed out by the pointer 260.

The memory 204 is, for example, a rewritable memory such as flash memory. The memory 204 stores basic operation programs for the display device 200 of the embodiment such as an operating system and given application programs. It is presupposed that the version and functions of the basic operation programs are upgraded by updating the programs stored in the memory 204. The memory 204 also records data and others.

The operation unit 205 receives various instructions from the user and has various operation buttons such as a power button. The communication unit 206 is an interface connected to the network 300 through radio communication such as the wireless LAN as described above. The connection unit 207 is an interface connected to other devices such as the display terminal 100, and it transmits and receives data to and from the other connected devices. The sound input unit 208 is, for example, a microphone to which audio signals are input.

The sound output unit 209 is, for example, a speaker that outputs audio signals. After image data received from other devices through the communication unit 107 is stored in the memory 204 and is subjected to image processing by the control unit 201, the image data is projected by the display unit 202, thereby displaying the display image 251 on the screen 252. At this time, when an audio signal is received, the audio signal is subjected to sound processing by the control unit 201 and is output from the sound output unit 209.

FIG. 3 is a configuration diagram of the display terminal 100. The display terminal 100 includes a control unit 101, a display unit 102, a memory 103, an operation unit 104, a storage 105, a camera 106, a communication unit 107, a connection unit 108, a sound input unit 109, and a sound output unit 110, which are interconnected via a system bus 120.

The control unit 101 is, for example, a microprocessor that performs overall control for the display terminal 100. The system bus 120 is a data communication path for data transmission/reception between the control unit 101 and other component units in the display terminal 100. The display unit 102 is a display device such as a liquid crystal display or organic EL display. The memory 103 is, for example, a rewritable memory such as flash memory. The memory 103 stores basic operation programs for the display terminal 100 of the embodiment such as an operating system and given application programs. It is presupposed that the version and functions of the basic operation programs are upgraded by updating the programs stored in the memory 204. The memory 204 also records data and others.

On the display surface of the display unit 102, a touch panel that functions as the operation unit 104 is provided. The operation unit 104 is touched with the finger tip, touch pen or the like, and detects and transmits the touched position to the control unit 101. For example, by displaying a menu such as a list of operation commands on the display unit 102 and touching an operation command selected from the list by the user, the touched position is detected, thereby inputting the various operation commands. The demagnifying button 152, overall display button 153, and magnifying button 154 are selected by displaying button icons on the display unit 102 and touching the positions of the button icons.

The storage 105 is an information memory medium such as a memory card. The camera 106 takes still images and moving images, and data of images taken by the camera is stored in the memory 103 or storage 105. The communication unit 107 is an interface connected to the network 300 through radio communication. The connection unit 108 is an interface connected to other devices, and it transmits and receives data to and from the other connected devices. The sound input unit 109 is, for example, a microphone to which audio signals are input. The sound output unit 110 is, for example, a speaker that outputs audio signals.

The display terminal 100A serving as the host terminal transmits display data selected from data stored in the memory 103A or storage 105A from the communication unit 107A through the network 300 to the display terminals 100B and 100C serving as the client terminals. Also, the display terminal 100A converts the display data into image data by applying image processing thereto by the control unit 101A and displays the image data on its own display unit 102A as the display image 151A. Furthermore, the display terminal 100A transmits the image data to the display device 200 from the communication unit 107A through the network 300. At this time, the display terminal 100A stores the display data and image data in the memory 103A.

In the display device 200, the image data received by the communication unit 206 is stored in the memory 204, is subjected to image processing by the control unit 201, and is then projected on the screen 252 to display the display image 251. Also, in the display terminal 100B serving as the client terminal, the display data received by the communication unit 107B is subjected to image processing by the control unit 101B to be converted into image data and is displayed on the display unit 102B as the display image 151B. At this time, the display data and image data are stored in the memory 103B. Also in the display terminal 100C, the same operation as that in the display terminal 100B is carried out.

Also, when pointer coordinates from the display device 200 are received by the communication unit 107, the pointer mark 150 is displayed at the position corresponding to the pointer coordinates in a superposed manner. In this state, when the demagnifying button 152 or the magnifying button 154 is selected, the image is displayed at a reduced or increased magnification scale approximately around the pointer mark 150 serving as the center thereof. Note that, when the pointer coordinates are received, the image may be automatically displayed in its magnified form approximately around the pointer mark 150 serving as the center thereof at the same time as the displaying of the pointer mark 150. This mode for automatically displaying the magnified image will hereinafter be referred to as automatic magnification mode. Whether or not the display terminal 100 is set to the automatic magnification mode is determined in advance by the user through the selections on a menu displayed on the display unit 102.

FIG. 4 depicts examples in which the display terminal 100 displays the display image 152 and the pointer mark 150 on the display unit 102. FIG. 4(a) depicts an example of display of the whole image data (magnification scale=1), and FIG. 4(b) depicts an example of display of a magnified version of the image data approximately around the position of the pointer mark 150 serving as the center thereof. In this example, the control unit 101 creates the image data through the image processing of magnifying the display data and extracting an image of a proper size that can be displayed on the display unit 102 approximately around the pointer coordinates serving as the center thereof.

The display terminal 100 displays the created image data as the display image 151 on the display unit 102, and displays the pointer mark 150 at the position corresponding to the pointer coordinates in a superposed manner. When the magnifying button 154 is selected in the state of FIG. 4(a) where the whole image data is displayed, the image is magnified approximately around the pointer mark 150 serving as the center thereof as shown in FIG. 4(b). Also, when the display terminal 100 is set to the automatic magnification mode, upon reception of the pointer coordinates, the display image 152 magnified approximately around the pointer mark 150 serving as the center thereof is automatically displayed as shown in FIG. 4(b).

FIG. 4(c) depicts the image given by horizontally scrolling the magnified image of FIG. 4(b) while maintaining its magnification scale. Obviously, the image may be scrolled further horizontally, vertically, or diagonally. When the overall display button 153 is selected in the states of FIGS. 4(*b*) and 4(*c*) where the magnified image is displayed, the whole image data as shown in FIG. 4(*a*) is displayed.

FIG. 5 is a flowchart showing an operation of the display device 200. It is presupposed that the process flow indicated by this flowchart starts from a step of turning on a power supply. First, it is determined whether the communication unit 206 has received image data transmitted from a different device (display terminal 100A in this case) through the network 300 (step S501). When the communication unit 206 has failed to receive image data, the flow proceeds to step S504 to be described later. When the communication unit 206 has received image data at step S501, the image data is stored in the memory 204 (step S502).

The image data is subjected to image processing by the control unit 201, and the display unit 202 then projects and displays the processed image data on the screen 252 as the display image 251 (step S503). Subsequently, the sensor unit 203 detects a position (pointer coordinates) pointed out on the display image 251 by laser light emitted from the pointer 260 (step S504). In this case, for example, the display image 251 is taken with a camera or the like. The image data captured by the camera is stored temporarily in the memory 204, and only the specific wavelength of laser light emitted from the pointer 260 is extracted from the image data, thereby detecting the position pointed out by the pointer 260.

When the pointer position is detected, the pointer coordinates representing the pointer position are transmitted from the communication unit 206 to each display terminal 100 through the network 300 (step S505). The pointer mark 250 is then displayed on the display image 251 at the position corresponding to the pointer coordinates in a superposed manner (step S506). After the pointer mark 250 is displayed, the flow returns to step S501 and repeats the process flow therefrom. Also when the position pointed out by the pointer 260 is not detected at step S504, the flow returns to step S501 and repeats the process flow therefrom.

FIG. 6 is a flowchart of a main operation of the display terminal 100. It is presupposed that the process flow indicated by this flowchart starts from a step of turning on a power supply. It is first determined whether a data selection mode is set (step S601). The data selection mode is the mode executed by the display terminal 100A serving as the host terminal, and the data selected here (referred to as display data) corresponds to data of the display image 251 displayed by the display device 200. When the data selection mode is set, a process flow for the data selection mode is carried out (step S602). The details of the data selection mode will be described later. When it is determined at step S601 that the data selection mode is not set, the process flow for the data selection mode is not carried out and the flow proceeds to step S603.

Next, it is determined whether the communication unit 107 has received display data from a different device (step S603). When the communication unit 107 has received the display data, a process flow for a data display mode is carried out (step S604). The details of the data display mode will be described later. When it is determined at step S603 that the communication unit 107 has not received the display data, the process flow for the data display mode is not carried out and the flow proceeds to step S605.

Subsequently, it is determined whether the communication unit 107 has received the data of pointer coordinates from the display device (step S605). When the communication unit 107 has received the data of pointer coordinates, a process flow for a pointer display mode is carried out (step S606), and the flow returns to the first step S601. The details of the pointer display mode will be described later. Note that, when it is determined at step S605 that the communication unit 107 has not received the data of pointer coordinates, the process flow for the pointer display mode is not carried out, and the flow returns to step S601.

Operations executed in the data selection mode (step S602), the data display mode (step S604), and the pointer display mode (step S606) will hereinafter be described in detail.

FIG. 7 is a flowchart showing an operation in the data selection mode. As described above, the process flow indicated in this flowchart represents the operation executed by the display terminal 100A serving as the host terminal.

First, data to be projected and displayed by the display device 200 is selected (step S601). In this step, a list of data stored in the memory 103 or the storage 105 is displayed on the display unit 102 (step S701) and a desired data (display data) is selected from the list (step S702). The selected display data is stored in the memory 103 (step S703), and is then transmitted from the communication unit 107 to a different display terminal 100 through the network 300 (step S704).

Subsequently, the display data is converted into image data through image processing by the control unit 101 (step S705), and the image data is also stored in the memory 103 (step S706). Then, the image data is displayed on the display unit 102 (step S707) and is transmitted from the communication unit 107 to the display device 200 through the network 300 (step S708), and the flow returns to the main operation process flow of FIG. 6.

The display terminal 100 that has received the display data transmitted thereto at step S704 proceeds from step S603 to step S604, and the data display mode described later is set thereto as shown in FIG. 6. The display device 200 that has received the image data transmitted thereto at step S708 stores the image data in the memory 204 (step S502) and projects and displays the image data as the display image 251 (step S503) as shown in FIG. 5.

FIG. 8 is a flowchart showing an operation in the data display mode. The process flow indicated by this flowchart represents the process executed by the display terminals 100B and 100C that have received the display data transmitted from the display terminal 100A serving as the host terminal (step S704 in FIG. 7).

When the communication unit 107 has received the display data transmitted through the network 300, the display terminal 100 converts the display data into image data through image processing by the control unit 101 (step S801). The display terminal 100 stores the converted image data in the memory 103 (step S802) and displays the image data on the display unit 102 as the display image 151 (step S803), and the flow returns to the main operation process flow of FIG. 6.

FIG. 9 is a flowchart showing an operation in the pointer display mode. The process flow indicated by this flowchart represents the operation executed when the data of pointer coordinates transmitted from the display device 200 is received as described above.

When the communication unit 107 has received the data of pointer coordinates transmitted through the network 300, the display terminal 100 stores the data of pointer coordinates in the memory 103 (step S901). Then, it is determined whether the display terminal 100 is set to the automatic magnification mode (step S902). When the display terminal 100 is set to the automatic magnification mode, it is determined whether the display image 151 currently displayed on the display unit 102 is a magnified version of the display image 151 (step S903).

When it is determined at step S903 that the currently displayed display image 151 is not a magnified version of the display image 151 (for example, normal display), the control unit 101 carries out the image processing on the display data to create magnified image data and displays the magnified version of the display image 151 on the display unit 102 (step S904). At this time, the magnification process is carried out so that the pointer coordinates are located at the approximate center of the display image 151. Then, the pointer mark 150 is displayed at the position of the pointer coordinates in a superposed manner (step S905), and the flow returns to the main operation process flow of FIG. 6.

When it is determined at step S902 that the display terminal 100 is not set to the automatic magnification mode, the flow proceeds from step S902 to step S905, and the pointer mark 150 is displayed at the position of the pointer coordinates in a superposed manner, and the flow returns to the main operation process flow of FIG. 6.

When it is determined at step S903 that the currently displayed display image 151 is a magnified version of the display image 151, the control unit 101 creates image data having its approximate center corresponding to the pointer coordinates from the display data while maintaining the current magnification scale, and displays the created image data on the display unit 102 (step S906). Then, the pointer mark 150 is displayed at the position of the pointer coordinates in a superposed manner (step S905), and the flow returns to the main operation process flow of FIG. 6.

Figure 10:
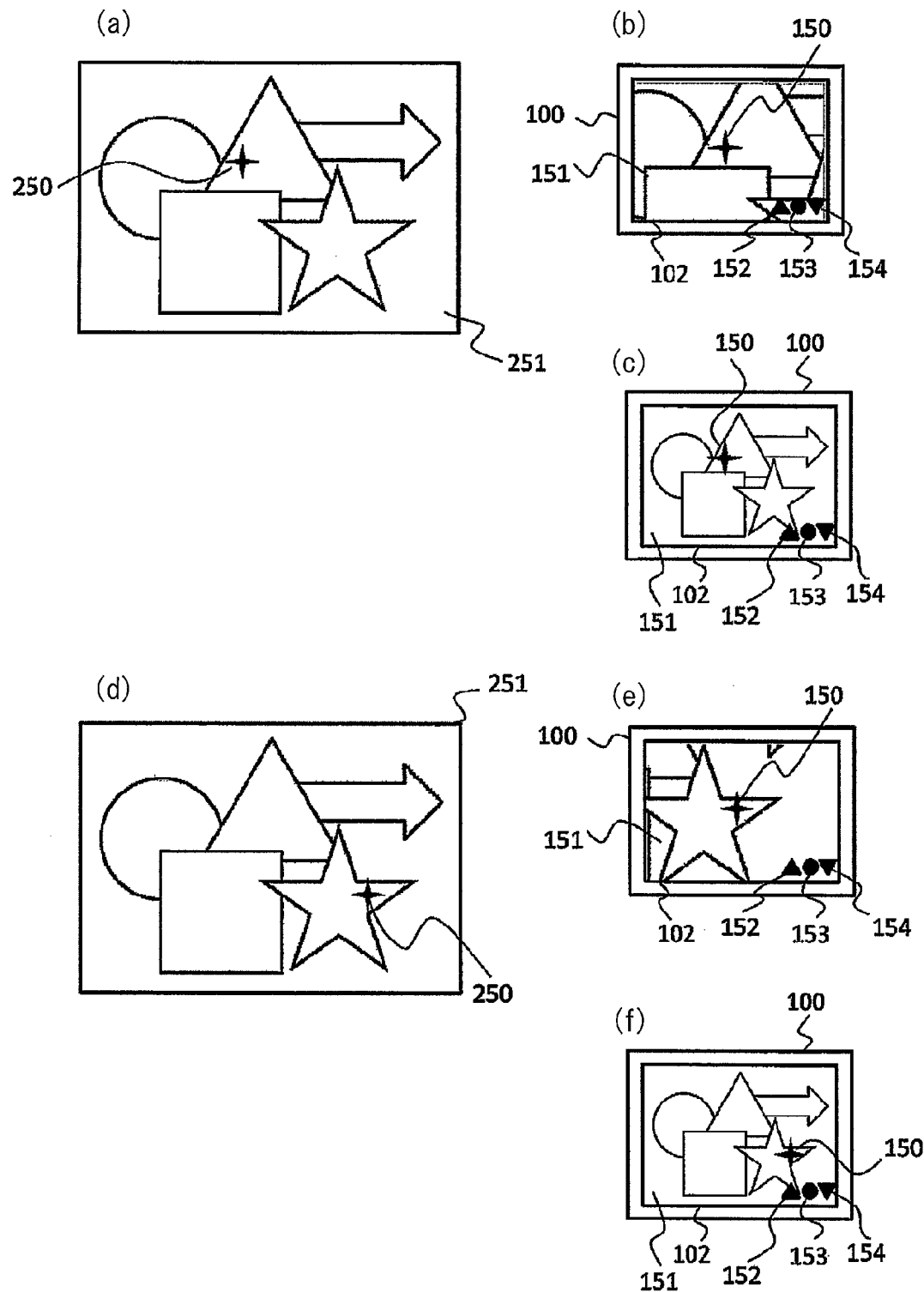
Figure 11:
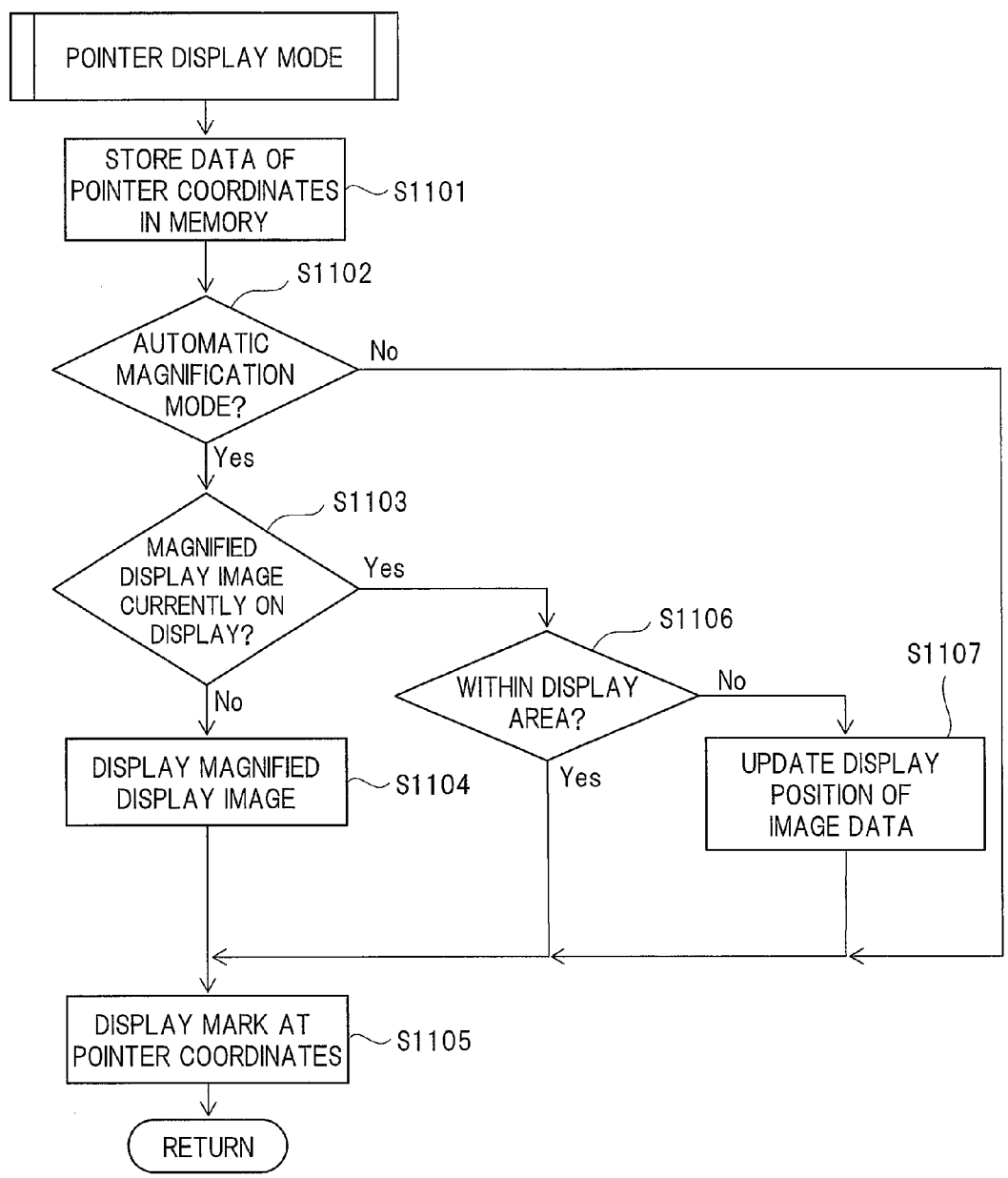

As shown in FIG. 10(a), the display device 200 projects and displays the display image 251 (step S503 in FIG. 5), detects the position pointed out by the pointer 260 (step S504 in FIG. 5), and displays the pointer mark 250 at the pointed out position in a superposed manner on the display image 251 (step S506 in FIG. 5). Examples of image display on the display terminal 100 at this time are shown in FIGS. 10(b) and 10(c). FIG. 10(b) depicts an example in the case where the display terminal 100 is set to the automatic magnification mode, and FIG. 10(c) depicts an example in the case where the display terminal 100 is not set to the automatic magnification mode.

When the display terminal 100 is set to the automatic magnification mode, as shown in FIG. 10(b), a magnified version of the display image 151 is displayed approximately around the pointer coordinates serving as the center thereof (step S904 in FIG. 9), and the pointer mark 150 is displayed at the position of the pointer coordinates in a superposed manner (step S905 in FIG. 9).

When the display terminal 100 is not set to the automatic magnification mode, as shown in FIG. 10(c), the display data received from the display terminal 100A serving as the host terminal is converted into image data (step S801 in FIG. 8), and the converted image data is displayed as the display image 151 (step S803 in FIG. 8), and the pointer mark 150 is displayed at the position of the pointer coordinates in a superposed manner (step S905 in FIG. 9).

FIG. 10(d) depicts an example of image display in the case where the position pointed out by the pointer 260 is shifted from that of FIG. 10(a). As shown in FIG. 10(d), the pointer mark 250 is displayed at a shifted position pointed out by the pointer 260 in a superposed manner on the display image 251. Examples of image display on the display terminal 100 at this time are shown in FIGS. 10(e) and 10(f).

FIG. 10(e) depicts an example of image display in the case where the display terminal 100 is set to the automatic magnification mode, and FIG. 10(f) depicts an example of image display in the case where the display terminal 100 is not set to the automatic magnification mode. When the display terminal 100 is set to the automatic magnification mode, since the image displayed on the display terminal 100 has already been magnified, as shown in FIG. 10(e), the image data having its approximate center corresponding to the pointer coordinates is created and displayed while maintaining the magnification scale (step S906 in FIG. 9). Further, the pointer mark 150 is displayed at the position of the pointer coordinates in a superposed manner (step S905 in FIG. 9).

When the display terminal 100 is not set to the automatic magnification mode, as shown in FIG. 10(f), the pointer mark 150 is displayed at the shifted position of the pointer coordinates (step S905 in FIG. 9).

When the overall display button 153 is selected in the states of FIGS. 10(b) and 10(e) where a magnified version of the display image 151 is displayed, the whole of the display data is displayed as shown in FIGS. 10(c) and 10(f). Also, when the magnifying button 154 is selected in the states of FIGS. 10(c) and 10(f) where the whole of the display data is displayed as the display image 151, the display image 151 is magnified around the pointer coordinates serving as the center thereof as shown in FIGS. 10(b) and 10(e).

As described above, by displaying the pointer mark 250 on the display image 251 projected and displayed by the display device 200 in a superposed manner, the position pointed out by the pointer 260 can be indicated emphatically. Furthermore, since the position thereof (pointer coordinates) is transmitted to the display terminal 100 and the pointer mark 150 is displayed also on the display image 151 of the display terminal 100, the position pointed out by the pointer 260 can be confirmed also on the display terminal 100.

Also, since the display data can be partially magnified and displayed on the display terminal 100 having a screen smaller than the display image 251, the user can check the details of the display contents. Furthermore, since the magnified image is displayed approximately around the pointer coordinates serving as the center thereof, the part of the image that the user of the display terminal 100 intends to see is always displayed on the display unit 102, and this allows the user to check the details of the display contents without requirements of cumbersome operations.

Second Embodiment

Next, a display system 400 according to a second embodiment of the present invention will be described. Since the hardware configurations of the display terminal 100 and the display device 200 are the same as those of the first embodiment, the descriptions thereof will be omitted. The operations of the display terminal 100 and the display device 200 of the second embodiment are different from those of the first embodiment in the operation of the display terminal 100 in the pointer display mode. In this embodiment, therefore, the pointer display mode of the display terminal 100 will be described.

FIG. 11 is a flowchart of the operation in the pointer display mode. The process indicated by this flowchart represents the operation carried out when the data of pointer coordinates transmitted from the display device 200 is received.

When the communication unit 107 has received the data of pointer coordinates through the network 300, the data of pointer coordinates is stored in the memory 103 (step S1101). Then, it is determined whether the display terminal 100 is set to the automatic magnification mode (step S1102). When the display terminal 100 is set to the automatic magnification mode, it is determined whether the display image 151 currently displayed on the display unit 102 is a magnified version of the display image 151 (step S1103).

When it is determined at step S1103 that the currently displayed display image 151 is a magnified version of the display image 151 (for example, normal display), the control unit 101 carries out the image processing on the display data to create magnified image data, and the magnified version of the display image 151 is displayed on the display unit 102 (step S1104). At this time, the magnification process is carried out so that the pointer coordinates are located at the approximate center of the display image 151. Then, the pointer mark 150 is displayed at the position of the pointer coordinates in a superposed manner (step S1105), and the flow returns to the main operation process flow.

When it is determined at step S1102 that the display terminal 100 is not set to the automatic magnification mode, the pointer mark 150 is displayed at the position of the pointer coordinates in a superposed manner (step S1105), and the flow returns to the main operation process flow.

When it is determined at step S1103 that the currently displayed display image 151 is a magnified version of the display image 151, it is determined whether the received pointer coordinates are within the display area of the currently displayed display image 151 (step S1106). When it is determined that the pointer coordinates are within the display area, the pointer mark 150 is displayed at the position of the pointer coordinates in a superposed manner without changing the display image 151 (step S1105), and the flow returns to the main operation process flow.

When it is determined at step S1106 that the pointer coordinates are not within the display area, the control unit 101 creates image data having its approximate center corresponding to the pointer coordinates again while maintaining the current magnification scale, and displays the created image data on the display unit 102 (step S1107). Then, the pointer mark 150 is displayed at the position of the pointer coordinates in a superposed manner (step S1105), and the flow returns to the main operation process flow.

FIG. 12 depicts examples of the display images 151 and 251 displayed on the display terminal 100 and the display device 200. FIG. 12(a) depicts an example of image display of the display device 200, and this is the same as FIG. 10(a) of the first embodiment, and therefore the description thereof will be omitted. An example of image display on the display terminal 100 at this time is shown in FIG. 12(b). In FIG. 12(b), in the same manner as the display terminal 100 of the first embodiment, a magnified version of the display image 151 is displayed approximately around the position of the pointer coordinates serving as the center thereof (step S1104 in FIG. 11), and the pointer mark 150 is displayed at the position of the pointer coordinates in a superposed manner (step S1105 in FIG. 11).

FIG. 12(c) depicts an example of image display in the case where the position pointed out by the pointer 260 is shifted from that of FIG. 12(a). As shown in FIG. 12(c), the pointer mark 250 is displayed at a shifted position pointed out by the pointer 260 in a superposed manner on the display image 251. As described above, when the amount of shift of the pointer coordinates is so small that the shifted pointer coordinates are within the display area of the currently displayed display image 151 (FIG. 12(b)), as shown in FIG. 12(d), the pointer mark 150 is displayed at the shifted position of the pointer coordinates in a superposed manner without changing the display image 151 (steps S1106 to S1105 in FIG. 11).

FIG. 12(e) depicts an example of image display in the case where the position pointed out by the pointer 260 is further shifted from the position of FIG. 12(c). As shown in FIG. 12(e), the pointer mark 250 is displayed at a shifted position pointed out by the pointer 260 in a superposed manner on the display image 251. As described above, when the amount of shift of the pointer coordinates is so large that the shifted pointer coordinates are not within the display area of the currently displayed display image 151 (FIG. 12(b)), as shown in FIG. 12(f), the image data having its approximate center corresponding to the pointer coordinates is created again as the display image 151 (step S1107 in FIG. 11), and the pointer mark 150 is displayed at the position of the pointer coordinates in a superposed manner (step S1105 in FIG. 11).

As described above, in the second embodiment, the same effect as the first embodiment can be achieved. Furthermore, in the display terminal, since the display image 151 is not changed when the pointer coordinates are within the display area at the time of displaying a magnified version of the image, the frequency of changes of the display image 151 can be reduced, so that an effect of improving the easiness in checking the display data contents can be achieved.

Third Embodiment

Next, a display system 400 according to a third embodiment of the present invention will be described. Since the hardware configurations of the display terminal 100 and the display device 200 are the same as those of the first and second embodiments, the descriptions thereof will be omitted. The operations of the display terminal 100 and the display device 200 of the third embodiment are different from those of the first and second embodiments in the operation of the display terminal 100 in the pointer display mode. In this embodiment, therefore, the pointer display mode of the display terminal 100 will be described.

FIG. 13 is a flowchart of the operation in the pointer display mode. The process indicated by this flowchart represents the operation carried out when the data of pointer coordinates transmitted from the display device 200 is received.

When the communication unit 107 has received the data of pointer coordinates through the network 300, the data of pointer coordinates is stored in the memory 103 (step S1301). Then, it is determined whether the display terminal 100 is set to the automatic magnification mode (step S1302). When the display terminal 100 is set to the automatic magnification mode, it is determined whether the display image 151 currently displayed on the display unit 102 is a magnified version of the display image 151 (step S1303).

When it is determined at step S1303 that the currently displayed display image 151 is a magnified version of the display image 151 (for example, normal display), the control unit 101 carries out the image processing on the display data to create magnified image data, and the magnified version of the display image 151 is displayed on the display unit 102 (step S1304). At this time, the magnification process is carried out so that the pointer coordinates are located at the approximate center of the display image 151. Then, the pointer mark 150 is displayed at the position of the pointer coordinates in a superposed manner (step S1305), and the flow returns to the main operation process flow.

When it is determined at step S1302 that the display terminal 100 is not set to the automatic magnification mode, the pointer mark 150 is displayed at the position of the pointer coordinates in a superposed manner (step S1305), and the flow returns to the main operation process flow.

When it is determined at step S1303 that the currently displayed display image 151 is a magnified version of the display image 151, it is determined whether the received pointer coordinates are within the display area of the currently displayed display image 151 (step S1306). When it is determined that the pointer coordinates are within the display area, the pointer mark 150 is displayed at the position of the pointer coordinates in a superposed manner without changing the display image 151 (step S1305), and the flow returns to the main operation process flow.

When it is determined at step S1306 that the pointer coordinates are not within the display area, an out-of-area mark indicative of a position out of the area is displayed in a superposed manner on the display image (step S1307). Next, it is determined whether the out-of-area mark is selected (step S1308). When it is determined that the out-of-area mark is selected, the control unit 101 creates image data having its approximate center corresponding to the pointer coordinates again while maintaining the current magnification scale, and displays the created image data on the display unit 102 (step S1309). Then, the pointer mark 150 is displayed at the position of the pointer coordinates in a superposed manner (step S1305), and the flow returns to the main operation process flow.

When the out-of-area mark is not selected at step S1308, the pointer mark 150 is deleted (step S1310), and the flow returns to the main operation process flow.

Figure 14:
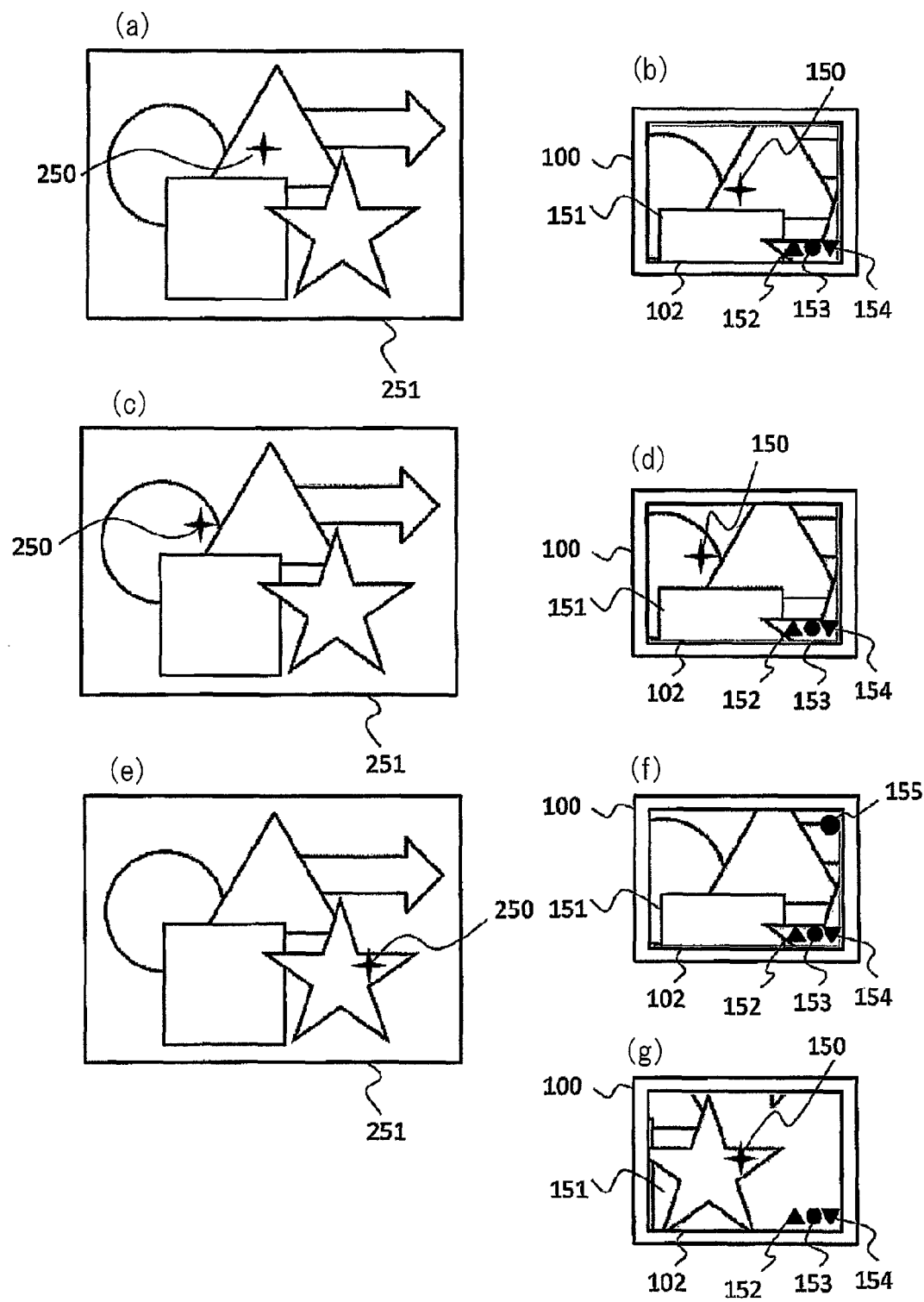

FIG. 14 depicts examples of the display images 151 and 251 displayed on the display terminal 100 and the display device 200. FIG. 14(a) depicts an example of image display of the display device 200, and this is the same as FIG. 10(a) of the first embodiment, and therefore the description thereof will be omitted. An example of image display on the display terminal 100 at this time is shown in FIG. 14(b). In FIG. 14(b), in the same manner as the display terminal 100 of the first embodiment, a magnified version of the display image 151 is displayed approximately around the position of the pointer coordinates serving as the center thereof (step S1304 in FIG. 13), and the pointer mark 150 is displayed at the position of the pointer coordinates in a superposed manner (step S1305 in FIG. 13).

FIG. 14(c) depicts an example of image display in the case where the position pointed out by the pointer 260 is shifted from that of FIG. 14(a). As shown in FIG. 14(c), this is the same as FIG. 12(c) of the second embodiment, and therefore, the description thereof will be omitted. As described above, when the amount of shift of the pointer coordinates is so small that the shifted pointer coordinates are within the display area of the currently displayed display image 151 (FIG. 14(b)), as shown in FIG. 14(d), the pointer mark 150 is displayed at the shifted position of the pointer coordinates in a superposed manner without changing the display image 151 (steps S1306 to S1305 in FIG. 13).

FIG. 14(e) depicts an example of image display in the case where the position pointed out by the pointer 260 is further shifted from the position of FIG. 14(c). As shown in FIG. 14(e), this is the same as FIG. 12(e) of the second embodiment, and therefore, the description thereof will be omitted. As described above, when the amount of shift of the pointer coordinates is so large that the shifted pointer coordinates are not within the display area of the currently displayed display image 151 (FIG. 14(b)), as shown in FIG. 14(f), an out-of-area mark 155 is displayed without changing the display image 151 (step S1307 in FIG. 13) and the pointer mark 150 is deleted (step S1309 in FIG. 13).

In this state, when the out-of-area mark 155 is selected, image data having its approximate center corresponding to the pointer coordinates is created again as the display image 151 (step S1310 in FIG. 13), and the pointer mark 150 is displayed at the position of the pointer coordinates in a superposed manner (step S1305 in FIG. 13).

As described above, in the third embodiment, the same effect as the first and second embodiments can be achieved. Furthermore, in the display terminal, the display image 151 is not changed if the pointer coordinates are within the display area when a magnified version of the image is displayed.

Also, even if the pointer coordinates are out of the display area, the display image 151 is not changed unless the user selects the out-of-area mark 155. Therefore, since the display image 151 is changed only at the timing intended by the user, the effect of improving the easiness in checking the display data contents can be achieved.

Furthermore, since the currently displayed image can be changed to the display image 151 having its approximate center corresponding to the pointer coordinates 150 just by selecting the out-of-area mark 155, the handiness in the third embodiment is not inferior to that achieved in the first and second embodiments.

Fourth Embodiment

Next, a display system 400 according to a fourth embodiment of the present invention will be described. Since the hardware configurations of the display terminal 100 and the display device 200 are the same as those of the first to third embodiments, the descriptions thereof will be omitted.

FIG. 15 is a flowchart showing an operation of the display device 200. It is presupposed that the process flow indicated by this flowchart starts from a step of turning on a power supply. First, it is determined whether the communication unit 206 has received image data transmitted from a different device (display terminal 100A in this case) through the network 300 (step S1501). When the communication unit 206 has failed to receive image data, the flow proceeds to step S1504 to be described later. When the communication unit 206 has received image data at step S1501, the image data is stored in the memory 204 (step S1502). The image data is subjected to image processing by the control unit 201, and the display unit 202 then projects and displays the processed image data on the screen 252 as the display image 251 (step S1503).

Subsequently, the sensor unit 203 detects a position (pointer coordinates) pointed out on the display image 251 by laser light emitted from the pointer 260 (step S1504). When the pointer position is detected, the pointer coordinates representing the pointer position are transmitted from the communication unit 206 to each display terminal 100 through the network 300 (step S1505). The pointer mark 250 is then displayed on the display image 251 at the position corresponding to the pointer coordinates in a superposed manner (step S1506). After the pointer mark 250 is displayed, the flow returns to step S1501 and repeats the process flow therefrom. Up to this step, the operation of the fourth embodiment is the same as that of the first embodiment.

When the position pointed out by the pointer 260 is not detected at step S1504, it is determined whether data of the pointer coordinates is received from the display terminal 100. When having received the pointer coordinates, the pointer mark 250 is displayed at the position corresponding to the pointer coordinates in a superposed manner on the display image 251 (step S1506), and the flow returns to step S1501 to repeat the process flow thereform. Also, when it is determined at step S1507 that the pointer coordinates have not been received, the flow returns to step S1501 to repeat the process flow thereform.

FIG. 16 is a flowchart of a main operation of the display terminal 100. It is presupposed that the process flow indicated by this flowchart starts from a step of turning on a power supply. It is first determined whether a data selection mode is set (step S1601). When the data selection mode is set, a process flow for the data selection mode is carried out (step S1602). When it is determined at step S1601 that the data selection mode is not set, the flow proceeds to step S1603.

Next, it is determined whether the communication unit 107 has received display data from a different device (step S1603). When the communication unit 107 has received the display data, a process flow for a data display mode is carried out (step S1604). When it is determined at step S1603 that the communication unit 107 has not received the display data, the flow proceeds to step S1605.

Subsequently, it is determined whether the communication unit 107 has received the data of pointer coordinates from a different device (step S1605). When the communication unit 107 has received the data of pointer coordinates, a process flow for a pointer display mode is carried out (step S1606). When it is determined at step S1605 that the communication unit 107 has not received the data of pointer coordinates, the flow proceeds to step S1607. Since the operations in the data selection mode, the data display mode, and the pointer display mode of the fourth embodiment are the same as those of the first to third embodiments, the detailed descriptions thereof will be omitted.

Next, it is determined whether the display terminal 100 is set to the pointer transmission mode (step S1607). In this case, the display terminal 100 is set to the pointer transmission mode by displaying a pointer transmission mode button 156 on the display unit 102 and selecting the pointer transmission mode button 156. When it is determined that the display terminal 100 is in the pointer transmission mode, a process flow for the pointer transmission mode is carried out (step S1608), and then the flow returns to the first step S1601.

The operation in the pointer transmission mode (step S1608) will hereinafter be described in detail.

FIG. 17 is a flowchart showing an operation in the pointer transmission mode. First, it is determined whether the selection by a touch pen 160 can be detected by the operation unit 104 (step S1701). When the selection cannot be detected, step S1701 is repeated. When the selection by the touch pen 160 can be detected, position coordinates selected by the touch pen 160 are calculated by the control unit 101 (step S1702). From the position coordinates selected by the touch pen 160 and the magnification scale, display area and others of the display image 151, pointer coordinates corresponding to the position coordinates on image data are calculated (step S1703) and are stored in the memory 103 (step S1704).

Then, the pointer mark 150 is displayed at the position of the pointer coordinates on the display image 151 in a superposed manner (step S1705). Next, data of the pointer coordinates is transmitted from the communication unit 107 to a different device (step S1706), and the flow returns to the main operation process flow of FIG. 16.

FIG. 18 depicts examples of the display images 151 and 251 displayed on the display terminal 100 and the display device 200. As shown in FIG. 18(a), when the pointer transmission mode button 156 is displayed at a given position on the display unit 102 and the pointer transmission mode button 156 is selected, the display terminal 100 executes the operation for the pointer transmission mode of FIG. 17. The details thereof will be described below.

As shown in FIG. 18(a), when an arbitrary position on the display unit 102 is selected by the touch pen 160 (step S1701 in FIG. 17), the operation unit 104 detects the selected position and calculates its position coordinates on the display image 151 (step S1702). At this time, when the display image 151 is displayed in its magnified form, pointer coordinates corresponding to the position coordinates on the display data are calculated from the magnification scale and display position of the display image 151 (step 1703 in FIG. 17), and the pointer mark 150 is displayed at the position of the pointer coordinates (step 1705 in FIG. 17).

FIG. 18(b) is an example of the display image 251 projected and displayed by the display device 200. In FIG. 18(b), the pointer mark 250 is displayed at the position of pointer coordinates transmitted from the display terminal 100 in a superposed manner on the display image 251 (step 1506 in FIG. 15). FIGS. 18(c) and 18(d) are examples of image display on the display terminals 100 other than the display terminal 100 of FIG. 18(a) on which a position of the display unit 102 is selected by the touch pen 160. FIG. 18(c) depicts an example in which the pointer mark 150 is displayed on the display image 151 displayed as the whole image, and FIG. 18(d) depicts an example in which the pointer mark 150 is displayed on the display image 151 displayed as its magnified version.

As shown in FIG. 18, by giving different shapes to the pointer marks 150 and 250 representing pointer coordinates transmitted from the display device 200, it becomes possible to distinguish whether the displayed pointer marks 150 and 250 represent pointer coordinates transmitted from the display device 200 or pointer coordinates transmitted from the display terminal 100. Also, the shapes of the pointer marks 150 and 250 may be made different for each of the display terminals 100. In such a case, it is possible to distinguish which display terminal 100 the pointer coordinates are transmitted from.

As described above, in the fourth embodiment, the same effect as the first to third embodiments can be achieved. Furthermore, since a position pointed out by the touch pen 160 on one display terminal 100 can be confirmed on the display device 200 and the other display terminals 100, the display system with improved handiness can be realized.

Fifth Embodiment

Next, a display system 400 according to a fifth embodiment of the present invention will be described. Since the hardware configurations of the display terminal 100 and the display device 200 are the same as those of the first to fourth embodiments, the descriptions thereof will be omitted.

FIG. 19 depicts examples of the display images 151 and 251 displayed on the display terminal 100 and the display device 200. As shown in FIG. 19(a), when the pointer 260 pointing out a position is moved on the display image 251 projected and displayed by the display device 200, the pointer mark 250 is displayed together with a pointer mark track 257. The pointer mark track 257 can be drawn by connecting the current pointer coordinates and the previous pointer coordinates by a line segment.

Examples of display of the display image 151 on the display terminal 100 at this time are shown in FIGS. 19(b) and 19(c). FIG. 19(b) depicts the case where the display image 151 is displayed as the whole image, and FIG. 19(c) depicts the case where the display image 151 is displayed as its magnified version. Also on the display terminal 100, the pointer mark 150 is displayed together with a pointer mark track 157 in the same manner as on the display device 200. The pointer mark track 157 is drawn by connecting the current pointer coordinates and the previous pointer coordinates by a line segment.

When the display terminal 100 is set to the automatic magnification mode, magnified image display is controlled so that the approximate center of the pointer mark track 157 is located at the center of the display image as shown in FIG. 19(c). Note that, though not shown, the magnified image display may be controlled so that the position of the pointer mark 150 is located at the approximate center of the display image.

Also, in the description above, the pointer mark track 157 is created in the display terminal 100, but the present invention is not limited to this. For example, it is also possible to create the data of the pointer mark track 257 in the display device 200, transmit the data to the display terminal 100, and then display the pointer mark track 157 based on the pointer mark track data.

As described above, in the fifth embodiment, the same effect as the first to fourth embodiments can be achieved. Furthermore, since the track of the position pointed out by the pointer 260 can be confirmed on the display device and all display terminals, the display system with improved handiness can be realized.

Sixth Embodiment

Next, a display system 400 according to a sixth embodiment of the present invention will be described. Since the hardware configurations of the display terminal 100 and the display device 200 are the same as those of the first to fifth embodiments, the descriptions thereof will be omitted.

Figure 20:
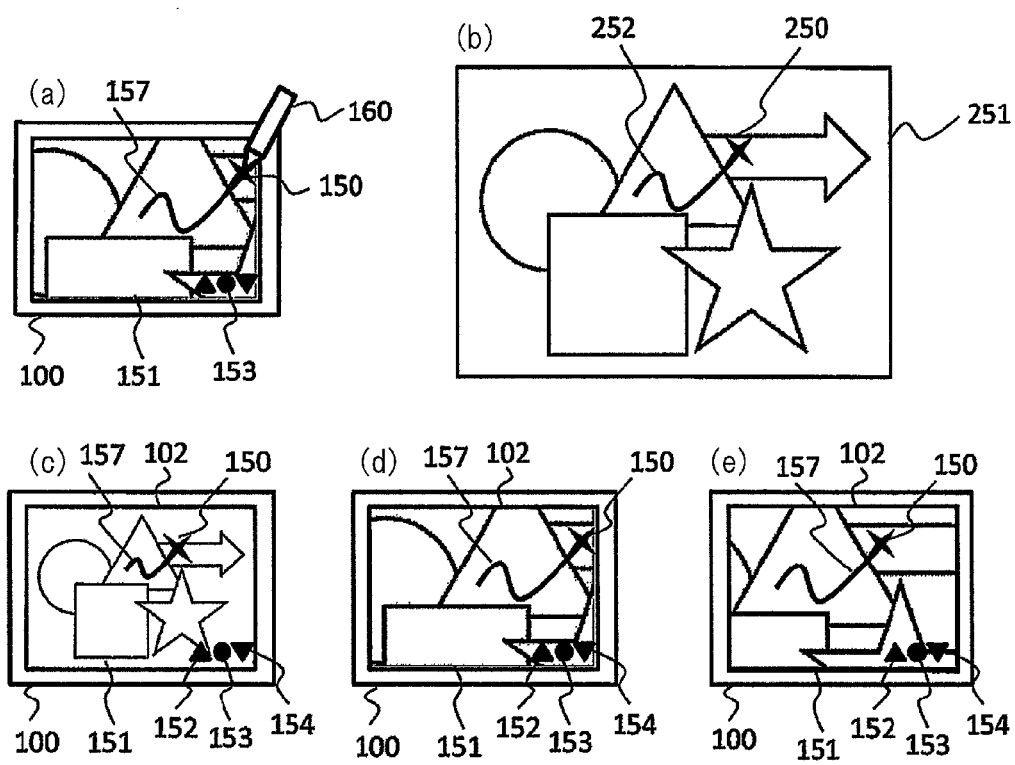

FIG. 20 depicts examples of the display images 151 and 251 displayed on the display terminal 100 and the display device 200. As shown in FIG. 20(a), when the touch pen 160 is moved on the display image 151 on the display terminal 100 while touching the screen, the pointer mark 150 is displayed together with a pointer mark track 157.

In the same manner as the fifth embodiment, the pointer mark track 157 can be drawn by connecting the current pointer coordinates and the previous pointer coordinates by a line segment. An example of display of the display image 251 on the display device 200 at this time is shown in FIG. 20(b).

As shown in FIG. 20(b), also on the display image 251 projected and displayed by the display device 200, the pointer mark 250 is displayed together with the pointer mark track 257. The pointer mark track 257 can be similarly drawn by connecting the current pointer coordinates and the previous pointer coordinates by a line segment.

Examples of display of the display image 151 on the other display terminals 100 are shown in FIGS. 20(c), 20(d), and 20(e). On all of the display terminals 100, the pointer mark 150 is displayed together with the pointer mark track 157. FIG. 20(c) depicts the case where the display image 151 is displayed as the whole image, and FIG. 20(d) and FIG. 20(e) depict the case where the display image 151 is displayed as its magnified version. In FIG. 20(d), the same display area as the display area of the display terminal 100 (FIG. 20(a)) operated with the touch pen 160 is displayed.

This can be realized by transmitting data of the magnification scale and display position together to the other devices when the display terminal 100 transmits the data of pointer coordinates. The other display device 100 which has received the data can determine the form of display of the display image 151 based on the received data of the magnification scale and display position.

Also, as shown in FIG. 20(e), the magnified image display may be controlled so that the approximate center of the pointer mark track 157 is located at the center of the display image. Note that, though not shown, the magnified image display may be controlled so that the position of the pointer mark 150 is located at the approximate center of the display image.

Also, in the description above, the pointer mark track 257 is created in the display device 200, but the present invention is not limited to this. For example, it is also possible to create the data of the pointer mark track 157 in the display terminal 100 operated with the touch pen 160, transmit the data to the display device 200, and then display the pointer mark track 257 based on the pointer mark track data.

Similarly, the display terminals 100 other than the display terminal 100 operated with the touch pen 160 may receive the pointer mark track data and display the pointer mark track 157.

Also, in the same manner as the fourth embodiment, by giving different shapes to the pointer marks 150 and 250 representing pointer coordinates transmitted from the display device 200, it becomes possible to distinguish whether the displayed pointer marks 150 and 250 represent pointer coordinates transmitted from the display device 200 or pointer coordinates transmitted from the display terminal 100.

Furthermore, in the same manner as the fourth embodiment, the shapes of the pointer marks 150 and 250 may be made different for each of the display terminals 100. In such a case, it is possible to distinguish which display terminal 100 the pointer coordinates are transmitted from.

As described above, in the sixth embodiment, the same effect as the first to fifth embodiments can be achieved. Furthermore, since the track of the operation of the touch pen 160 can be confirmed on the display device and all display terminals, the display system with improved handiness can be realized.

Seventh Embodiment

Next, a display system 400 according to a seventh embodiment of the present invention will be described. Since the hardware configurations of the display terminal 100 and the display device 200 are the same as those of the first to fifth embodiments, the descriptions thereof will be omitted.

Figure 21:
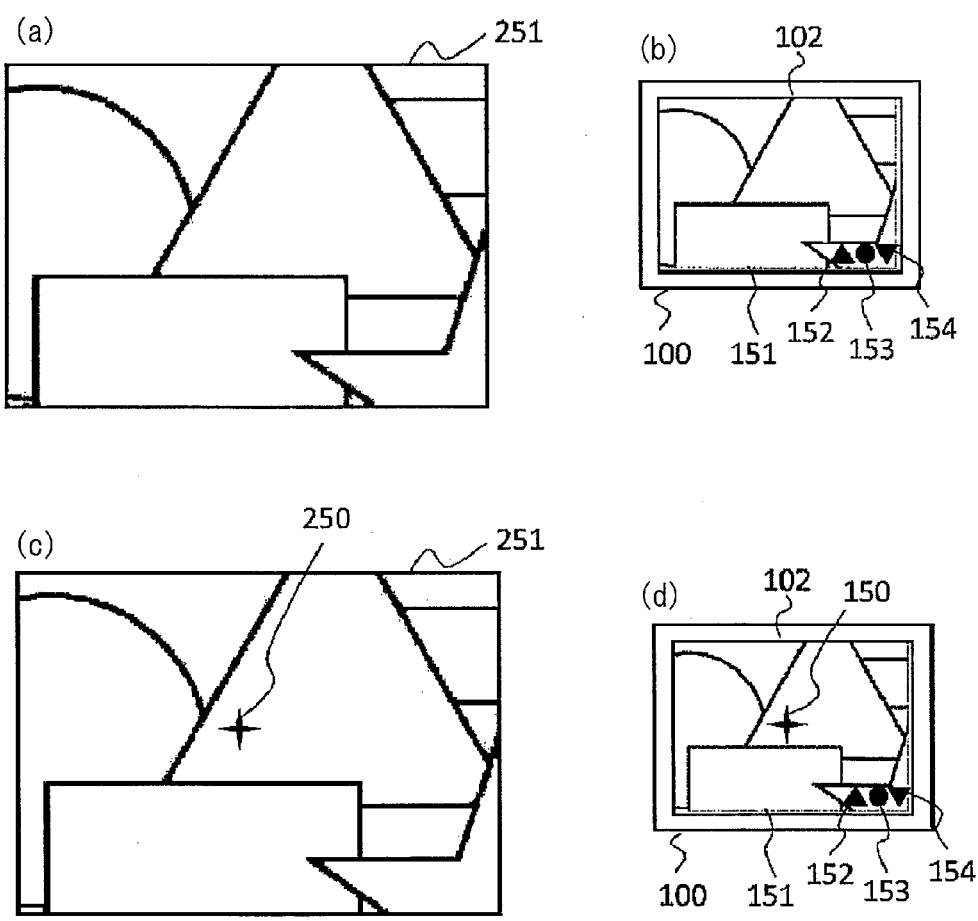

FIG. 21 depicts examples of the display images 151 and 251 displayed on the display terminal 100 and the display device 200. As shown in FIG. 21(a), a magnified version of the display image 251 is displayed on the display device 200. This magnified display image 251 is projected and displayed on the display unit 202 through the magnification process of image data by the control unit 201 instructed by the user operation to the operation unit 205 of the display device 200.

At this time, the display device 200 transmits data of the magnification scale and display position to the display terminal 100 through the communication unit 206. At this time, the display terminal 100 displays the display image 151 magnified in the same manner as the display image 251 as shown in FIG. 21(b). In this case, the control unit 101 creates magnified image data by using the display data and the data of the magnification scale and display position received from the display device 200 so that the display image 151 almost identical to the display image 251 is formed, and the created image data is displayed on the display unit 102 as the display image 151.

As shown in FIG. 21(c), also when a position is pointed out by the pointer 260 on the magnified display image 251, the pointer mark 250 is similarly displayed. At this time, the pointer mark 150 is displayed on the display terminal 100 as shown in FIG. 21(d).

As described above, by transmitting and receiving the data of the magnification scale and display position so as to share the data between the display terminal 100 and the display device 200, when the display device 200 displays the magnified display image 251, the display terminal 100 can display the image corresponding to the magnified display image 251.

In the description above, a magnified version of the display image 251 is displayed by the operation on the operation unit 205 of the display device 200, but the present invention is not limited to this. For example, a magnified version of the display image 251 may be displayed by transmitting a magnification display instruction from the display terminal 100 to the display device 200.

As described above, in the seventh embodiment, the same effect as the first to sixth embodiments can be achieved. Furthermore, when the display device 200 displays a magnified version of the display image 251, the display terminal 100 similarly displays the magnified display image, so that the display system with improved handiness can be realized.

Note that, in the description of the display system 400 of the first to seventh embodiments, the case of using the wireless LAN for the communication with the network 300 has been described, but the present invention is not limited to this. For example, it is also possible to make the communication based on other communication methods such as W-CDMA (Wideband Code Division Multiple Access) and GSM (Global System for Mobile Communications (registered trademark)) through a base station (not depicted).

In this case, even when a user is in a remote place, the user is able to participate in a meeting or the like in which the display device 200 is used as long as the user is within a range of communication with the base station. At this time, audio signals input to the sound input unit 208 of the display device 200 are transmitted to each display terminal 100 and are output from the sound output unit 110 of the display terminal 100. Obviously, communication through Bluetooth (registered trademark) or wired LAN is also applicable.

Also, the display terminal 100A serving as the host terminal and the display device 200 transmit and receive image data through the network 300, but the present invention is not limited to this. For example, example, it is also possible to connect the connection unit 108A of the display terminal 100A and the connection unit 207 of the display device 200 via a connection cable (not depicted) and to transmit and receive the image data through the connection cable.

Also, in the case of the wired connection by the connection cable mentioned above, it is not always necessary to provide the communication unit 206. At this time, the data of pointer coordinates is transmitted to the display terminal 100A through the connection cable, and the display terminal 100A transmits the data of pointer coordinates to the other display terminals 100B and 100C.

Also, in the description above, the display device 200 is provided with the sensor unit that detects a position pointed out by the pointer 260, but the present invention is not limited to this, and the sensor unit may be provided separately from the display device 200.

Also, in the description above, the display unit 202 of the display device 200 is a projector, but the present invention is not limited to this. For example, the display unit 202 may be a liquid crystal panel, plasma display panel, organic EL, and others.

Also, in the description above, the pointer 260 emits optical light from a remote place to point out an arbitrary position like a laser pointer, but the present invention is not limited to this, and the pointer 260 may be a pointer rod, touch pen, and others.

Also, in the description above, the sensor unit 203 takes a display image like a camera and detects pointer coordinates, but the present invention is not limited to this. For example, the sensor unit may detect a position pointed out by the pointer 206 by receiving signals such as ultrasonic waves, infrared light and others output from the pointer 260 at multiple spots and calculating the distance between the sensor unit and the pointer 260.

Also, the sensor unit 203 may be a touch panel or the like that detects a direct touch onto the display image 251.

Some or the whole of the configurations, functions, processing units, processing means and others mentioned above may be realized in the form of hardware by designing them with, for example, integrated circuits. Alternatively, the above-mentioned configurations, functions and the like may be realized by software by, for example, allowing microprocessor units to interpret and execute the programs for realizing the respective functions. Programs for realizing the respective functions may be stored in advance in a memory, storage, and others, or may be downloaded afterward from an external application server into a memory, storage, and others.

DESCRIPTION OF REFERENCE CHARACTERS

100 Display terminal
102 Display unit
150 Pointer mark
151 Display image
157 Pointer mark track
160 Touch pen
200 Display device
250 Pointer mark
251 Display image
257 Pointer mark track
260 Pointer
300 Network
400 Display system

The invention claimed is:
1. A display system comprising:
a display terminal; and
a display device
wherein the display terminal includes:
a first display unit configured to display image data in both of a first display mode in which all of the image data is displayed and a second display mode in which a part of the image data is displayed in a magnified manner in comparison with the display in the first display mode; and a first communication unit configured to transmit the image data to the display device, wherein the display device includes:

a second communication unit configured to receive the image data from the display terminal;

a second display unit configured to display received image data in a display screen larger than a display screen of the first display unit of the display terminal; and a detection unit configured to detect position coordinates pointed out by a pointer device, different from the display terminal, on a displayed image on the second display unit, the display device displays a first pointer mark on the displayed image on the second display unit based on the position coordinates detected by the detection unit, the display device transmits the position coordinates detected by the detection unit to the display terminal, the display terminal is configured to display a second pointer mark at a position corresponding to the position coordinates in the image data displayed on the display screen of the first display unit in both of the first display mode and the second display mode, and a position of the part of the image data displayed in a magnified manner in the second display mode is determined based on the position coordinates received from the display device.

2. The display system according to claim 1, wherein the display terminal displays, on the first display unit, an image corresponding to a part of the image displayed on the second display unit of the display device so that the position of the received position coordinates is located at an approximate center of the image in the second display mode.

3. A display terminal including a display unit and configured to communicate with a display device configured to display on a display screen larger than a display screen of the display unit, the display terminal comprising:

the display unit configured to display image data in both of a first display mode in which all of the image data is displayed and a second display mode in which a part of the image data is displayed in a magnified manner in comparison with the display in the first display mode; and a communication unit configured to transmit the image data to the display device, the communication unit receives, from the display device, position coordinates pointed out by a pointer device, different from the display terminal, on a displayed image on the display device, a pointer mark is displayed at a position corresponding to the position coordinates in the image data displayed on the display screen of the display unit in both of the first display mode and the second display mode, and a position of the part of the image data displayed in a magnified manner in the second display mode is determined based on the position coordinates received from the display device.

4. The display terminal according to claim 3, wherein the display terminal displays, on the display unit, an image corresponding to a part of the image displayed on the display device so that the position of the received position coordinates is located at an approximate center of the image in the second display mode.

5. The display terminal according to claim 3, wherein, when a position shown by newly received position coordinates is out of a display area of the display data displayed on the display unit in the second display mode, the display terminal changes display contents of the display unit to display contents displaying an image corresponding to a part of the image displayed on the display device so that the position shown by the newly received position coordinates is located at an approximate center of the image.

6. The display terminal according to claim 3, wherein, when a position shown by newly received position coordinates is out of a display area of the display data displayed on the display unit, the display terminal displays a predetermined mark on the display unit.

7. A display system comprising a first display terminal, a second display terminal, and a display device, wherein the first display terminal includes:

a first display unit; and a first communication unit configured to with the display device and the second display terminal, the second display terminal includes:

a second display unit; and a second communication unit configured to communicate with the first display terminal and the display device, the second display unit being configured to display in both of a first display mode in which all of image data received from the display terminal via the communication unit is displayed and a second display mode in which a part of the image data is displayed in a magnified manner in comparison with the display in the first display mode, the display device includes:

a third display unit configured to display in a display screen larger than a display screen of the first display unit of the display terminal and a display screen of the second display unit of the second display terminal;

a detection unit configured to detect position coordinates pointed out by a pointer device, different from the second display terminal, on a displayed image on the third display unit; and a communication unit configured to communicate with the first display terminal and the second display terminal, the first display terminal transmits the image data to the display device and the second display terminal, the display device receives the image data from the first display terminal, displays the received image data on the third display unit, displays a first pointer mark on the displayed image on the third display unit based on the position coordinates detected by the detection unit, and transmits the position coordinates detected by the detection unit to the second display terminal, the second display terminal receives the image data from the first display terminal, receives the position coordinates from the display device, is configured to display all of the image data and a second pointer mark at a position corresponding to the position coordinates in the image data on the second display unit of the second display terminal based on the received image data and the received image coordinates in the first display mode, and is configured to display the part of the image data and the second pointer mark at the position corresponding to the position coordinates in the image data on the second display unit of the second display terminal based on the received image data and the received image coordinates in the second display mode, and a position of the part of the image data displayed in a magnified manner in the second display mode is determined based on the position coordinates received from the display device.

8. The display system according to claim 7, wherein the second display terminal displays, on the second display unit, an image corresponding to the part of the image displayed on the third display unit of the display device so that the position of the position coordinates received from the display device is located at an approximate center of the image in the second display mode.

9. A display terminal including a display unit and configured to communicate with a display device configured to display on a display screen larger than a display screen of the display unit and an external device, the display terminal comprising:

a communication unit configured to receive image data from the external device; and the display unit configured to display the image data in both of a first display mode in which all of the image data is displayed and a second display mode in which a part of the image data is displayed in a magnified manner in comparison with the display in the first display mode, the communication unit receives, from the display device, position coordinates pointed out by a pointer device, different from the display terminal, on a displayed image on the display device, a pointer mark being displayed at a position corresponding to the position coordinates in the image data displayed on the display screen of the display unit in both of the first display mode and the second display mode, and a position of the part of the image data displayed in a magnified manner in the second display mode is determined based on the position coordinates received from the display device.

10. The display terminal according to claim 9, wherein the display terminal displays, on the display unit, an image corresponding to the part of the image displayed on the display unit so that the position of the received position coordinates is located at an approximate center of the image in the second display mode.

11. The display terminal according to claim 9, wherein, when a position shown by newly received position coordinates is out of a display area of the display data displayed on the display unit in the second display mode, the display terminal changes display contents of the display unit to display contents displaying an image corresponding to a part of the image displayed on the display device so that the position shown by the newly received position coordinates is located at an approximate center of the image.

12. The display terminal according to claim 9, wherein, when a position shown by newly received position coordinates is out of a display area of the display data displayed on the display unit, the display terminal displays a predetermined mark on the display unit.

* * * * *